(12) United States Patent
Ito et al.

(10) Patent No.: US 10,112,645 B2
(45) Date of Patent: Oct. 30, 2018

(54) TRAVELING VEHICLE

(71) Applicant: KUBOTA CORPORATION, Osaka (JP)

(72) Inventors: Hirokazu Ito, Osaka (JP); Kazuo Koike, Hyogo (JP); Yoshikazu Togoshi, Osaka (JP)

(73) Assignee: KUBOTA CORPORATION, Osaka (JP)

( * ) Notice: Subject to any disclaimer, the term of this patent is extended or adjusted under 35 U.S.C. 154(b) by 44 days.

(21) Appl. No.: 15/284,861

(22) Filed: Oct. 4, 2016

(65) Prior Publication Data

US 2017/0021861 A1 Jan. 26, 2017

Related U.S. Application Data

(63) Continuation of application No. 14/483,438, filed on Sep. 11, 2014, now Pat. No. 9,731,760.

(30) Foreign Application Priority Data

Dec. 25, 2013 (JP) .................................. 2013-267196
Dec. 25, 2013 (JP) .................................. 2013-267197
Dec. 25, 2013 (JP) .................................. 2013-267198

(51) Int. Cl.
*B62D 11/04* (2006.01)
*B62D 1/02* (2006.01)
(Continued)

(52) U.S. Cl.
CPC ............ *B62D 11/04* (2013.01); *A01D 34/001* (2013.01); *A01D 34/006* (2013.01);
(Continued)

(58) Field of Classification Search
CPC . B62D 11/04; B62D 1/02; B62D 1/12; B62D 51/001; B62D 51/02; A01D 34/001; A01D 34/006; A01D 34/822; A01D 69/02
See application file for complete search history.

(56) References Cited

U.S. PATENT DOCUMENTS 6,234,495 B1 * 5/2001 Velke ..................... B60D 1/143
280/32.7
6,435,535 B1 8/2002 Field
(Continued)

FOREIGN PATENT DOCUMENTS

JP 2000-189466 7/2000
JP 2005-022631 1/2005
(Continued)

OTHER PUBLICATIONS

Japanese Office Action issued in Patent Application No. JP2013-267197, dated Aug. 17, 2016.
(Continued)

*Primary Examiner* — Joseph M Rocca
*Assistant Examiner* — Marlon A Arce
(74) *Attorney, Agent, or Firm* — Greenblum & Bernstein, P.L.C.

(57) ABSTRACT

A traveling vehicle including a traveling machine body supported by a pair of left and right driving wheels; a pair of left motor and the right motor configured to independently drive the driving wheels; a riding part disposed behind the traveling machine body and connected to the traveling machine body, and configured to enable riding of a worker; a handle connected to the traveling machine body so as to be swingable left and right with respect to the traveling machine body; a plurality of load sensors for detecting a forward and backward weight shift of the worker who is riding on the riding part; a rotation angle sensor for detecting a leftward and rightward swinging operation (Continued)

amount of the handle; and a controller for controlling operation of the left and right motors based on detection values by the plurality of load sensors and the rotation angle sensor.

11 Claims, 22 Drawing Sheets

(51) Int. Cl.
    *B62D 51/02* (2006.01)
    *A01D 34/00* (2006.01)
    *A01D 34/82* (2006.01)
    *B62D 51/00* (2006.01)
    *B62D 1/12* (2006.01)
    *A01D 69/02* (2006.01)

(52) U.S. Cl.
    CPC .......... *A01D 34/822* (2013.01); *A01D 69/02* (2013.01); *B62D 1/02* (2013.01); *B62D 1/12* (2013.01); *B62D 51/001* (2013.01); *B62D 51/02* (2013.01)

(56) References Cited

U.S. PATENT DOCUMENTS

| | | | |
|---|---|---|---|
| 6,490,849 B1* | 12/2002 | Scag | A01D 34/001 56/10.8 |
| 6,595,306 B2* | 7/2003 | Trego | B62D 51/001 180/19.2 |
| 7,275,607 B2 | 10/2007 | Kamen | |
| 7,467,677 B2 | 12/2008 | Barrier | |
| 7,647,754 B2 | 1/2010 | Velke et al. | |
| 7,712,751 B2 | 5/2010 | Beal | |
| 7,717,200 B2 | 5/2010 | Kakinuma | |
| 8,240,414 B2 | 8/2012 | Sasahara et al. | |
| 8,262,104 B2 | 9/2012 | Kallevig et al. | |
| 8,365,850 B2 | 2/2013 | Gal et al. | |
| 8,640,807 B2 | 2/2014 | Takenaka | |
| 2005/0016782 A1* | 1/2005 | Gallagher | B62B 3/0612 180/89.12 |
| 2005/0039957 A1* | 2/2005 | David | B62D 6/10 180/19.1 |
| 2011/0000731 A1 | 1/2011 | Boeckler | |
| 2011/0278088 A1 | 11/2011 | Weihl et al. | |
| 2014/0102814 A1* | 4/2014 | Grison | B66F 9/24 180/19.2 |
| 2014/0188338 A1 | 7/2014 | Ito et al. | |
| 2016/0083024 A1* | 3/2016 | Mori | B62D 51/001 701/70 |

FOREIGN PATENT DOCUMENTS

| | | |
|---|---|---|
| JP | 2007-336785 | 12/2007 |
| JP | 2009-254004 | 10/2009 |

OTHER PUBLICATIONS

Japanese Office Action issued in Patent Application No. JP2013-267197, dated Feb. 21, 2017.
Office Action issued in Japan Counterpart Patent Appl. No. 2013-267196, dated May 2, 2017.

\* cited by examiner

TRAVELING VEHICLE

CROSS-REFERENCE TO RELATED APPLICATIONS

This application is a continuation of U.S. patent application Ser. No. 14/483,438, filed Sep. 11, 2014, to which benefit is claimed under 35 USC § 120, and which claims priority under 35 USC § 119 of the following three applications: Japanese Patent Application 2013-267196, filed Dec. 25, 2013; Japanese Patent Application 2013-267197, filed Dec. 25, 2013; and Japanese Patent Application 2013267198, filed Dec. 25, 2013. The disclosure of each of the aforementioned applications is hereby incorporated by reference thereto in its entirety.

BACKGROUND

1. Field of the Invention

The disclosure relates to a technology of a traveling vehicle that independently drives a pair of left and right driving wheels.

2. Description of Background

Heretofore, there is publicly known a technology of a traveling vehicle that independently drives a pair of left and right driving wheels, for example, as disclosed in U.S. Pat. No. 8,240,414.

U.S. Pat. No. 8,240,414 discloses a traveling vehicle that includes a traveling machine body which is supported by a pair of left and right driving wheels, and a pair of left and right motors which independently drives the pair of left and right driving wheels, respectively.

Further, there is publicly known a technology for operating a traveling vehicle, as disclosed in U.S. Pat. No. 8,262,104. U.S. Pat. No. 8,262,104 discloses a traveling vehicle that includes a pair of left and right control levers. The pair of left and right driving wheels can be driven independently by operating the pair of left and right control levers, respectively. In such a traveling vehicle, the pair of left and right control levers is rotated in a front and back direction, so that the traveling vehicle can be made to travel in an arbitrary direction.

Specifically, the pair of left and right control levers is rotated by the same amount, so that the traveling vehicle can be made to travel straight. Additionally, the pair of left and right control levers is rotated by respective different amounts, so that the traveling vehicle can be steered either right or left. The steering angle at this time is determined based on a difference between the rotation amounts of the pair of left and right control levers.

However the steering angle of the traveling vehicle is determined based on the difference between the rotation amounts of the left and right control levers, and therefore such a traveling vehicle has room for improvement in operability in respect that a worker needs to get used to steering the traveling vehicle in a desired direction.

SUMMARY

In view of the above circumstances, an object of the disclosure provides a traveling vehicle for independently driving a pair of left and right driving wheels, which is excellent in operability.

The problem to be solved by the disclosure has been described above, and means for solving the problem is now described.

That is, a traveling vehicle according to the disclosure includes: a traveling machine body supported by a pair of left and right driving wheels; a pair of left and right motors connected to the pair of left and right driving wheels, respectively, and configured to independently drive the pair of left and right driving wheels, respectively; a riding part disposed behind the traveling machine body, connected to the traveling machine body, and configured to enable riding of a worker; a handle connected to the traveling machine body so as to be swingable left and right with respect to the traveling machine body; a weight shift detection sensor configured to detect a forward and backward weight shift of the worker who is riding on the riding part; a swinging operation detection sensor configured to detect a leftward and rightward swinging operation amount of the handle; and a controller configured to control operation of the pair of left and right motors based on detection values by the weight shift detection sensor and the swinging operation detection sensor.

A traveling vehicle according to the disclosure includes: a traveling machine body supported by a pair of left and right driving wheels; a pair of left and right motors connected to the pair of left and right driving wheels, respectively, and configured to independently drive the pair of left and right driving wheels, respectively; a riding part disposed behind the traveling machine body, connected to the traveling machine body, configured to enable riding of a worker, and including a leg placing surface on which the worker places his/her leg when riding; a handle formed with a grip part configured to enable gripping of the worker who is riding on the riding part, connected to the traveling machine body so as to be swingable left and right with respect to the traveling machine body, and provided at such a position that a height of a swing fulcrum is at most a half of a height from the leg placing surface to the grip part, and is higher than a height of the leg placing surface; a swinging operation detection sensor configured to detect a leftward and rightward swinging operation amount of the handle; and a controller configured to control operation of the pair of left and right motors based on a detection value by the swinging operation detection sensor.

A traveling vehicle according to the disclosure includes: a traveling machine body supported by a pair of left and right driving wheels; a pair of left and right motors connected to the pair of left and right driving wheels, respectively, and configured to independently drive the pair of left and right driving wheels, respectively; a work device disposed in front of the traveling machine body, and connected to the traveling machine body; a riding part disposed behind the traveling machine body, connected to the traveling machine body, and configured to enable riding of a worker; a weight shift detection sensor configured to detect a weight shift of the worker who is riding on the riding part; and a controller configured to control operation of the pair of left and right motors based on a detection value by the weight shift detection sensor.

A traveling vehicle according to the disclosure includes: a traveling machine body supported by a pair of left and right driving wheels; a motive power part for generating power for driving the pair of left and right driving wheels and transmitting the power to the pair of left and right driving wheels, the motive power part being provided in the traveling machine body, a riding part disposed behind the traveling machine body, connected to the traveling machine body, and configured to enable riding of a worker, a handle connected to the traveling machine body, and provided so as to extend upward from the traveling machine body; a driven wheel disposed at a position different from a rotational axis of the pair of left and right driving wheels; and a work device disposed in front of the traveling machine body, and connected to the traveling machine body.

As effects of the disclosure, the following effects are obtained.

In the traveling vehicle according to the disclosure, it is possible to provide a traveling vehicle for independently driving a pair of left and right driving wheels, which is excellent in operability. That is, the worker can shift the weight forward and backward while riding on the riding part, and perform the swinging operation of the handle to the left and right, so that the worker can intuitively drive the traveling vehicle.

In the traveling vehicle according to the disclosure, it is possible to provide a traveling vehicle for independently driving a pair of left and right driving wheels, which is excellent in operability. That is, it is possible to reduce a difference between an inclination angle of the handle to the left and right and an inclination angle of the posture of the worker to the left and right when the handle is swingably operated. Consequently, the worker can operate the handle without uncomfortable feeling. Additionally, the swing fulcrum of the handle is provided at a position higher than at least the leg placing surface of the riding part, and therefore it is possible to secure a space for disposing other members below the swing fulcrum.

In the traveling vehicle according to the disclosure, it is possible to provide a traveling vehicle for independently driving a pair of left and right driving wheels, which is excellent in operability. That is, the worker can intuitively drive the traveling vehicle by shifting the weight while riding on the riding part.

In the traveling vehicle according to the disclosure, it is possible to provide a traveling vehicle for independently driving a pair of left and right driving wheels, which is excellent in operability. That is, the worker can drive the traveling vehicle while visually recognizing the traveling machine body and the work device located on the front at a state of riding on the riding part, and therefore it is possible to easily operate the traveling vehicle.

DETAILED DESCRIPTION

Figure 1:
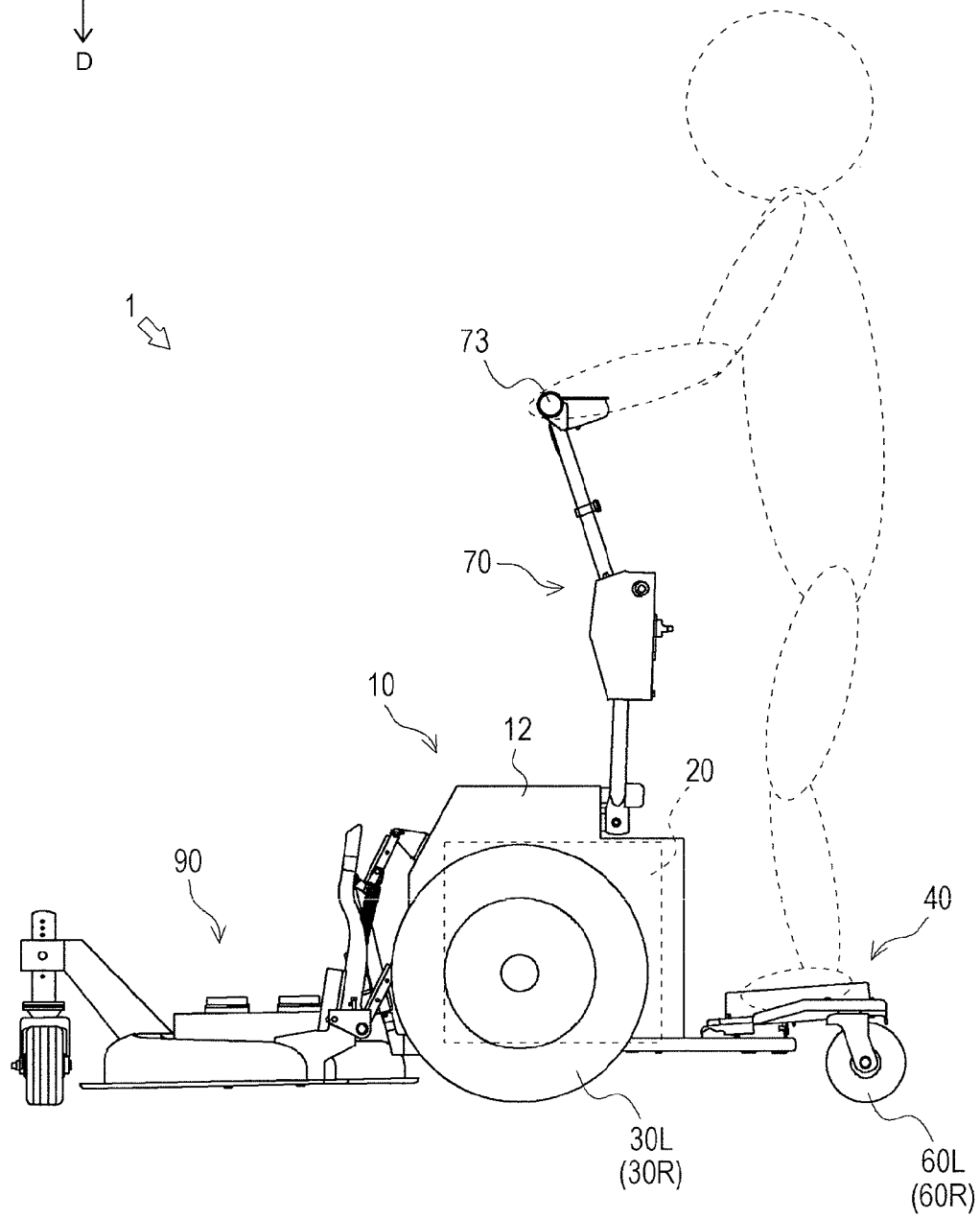
FIG. 1 is a side view showing a situation where a worker rides on a traveling vehicle according to a first embodiment of the disclosure.

Hereinafter the direction of an arrow U, the direction of an arrow D, the direction of an arrow L, the direction of an arrow R, the direction of an arrow F, and the direction of an arrow B shown in the drawings are defined as an upper direction, a lower direction, a left direction, a right direction, a front direction, and a back direction, respectively, and description is made.

Hereinafter an entire configuration of a traveling vehicle 1 according to an embodiment (a first embodiment) of the disclosure is described with reference to FIGS. 1 to 5.

The traveling vehicle 1, on which a worker rides, travels, and enables the worker to perform predetermined work. The traveling vehicle 1 mainly includes a traveling machine body 10, a motive power part 20, a driving wheel 30L and a driving wheel 30R, a riding part 40, a driven wheel 60L and a driven wheel 60R, a handle 70, and a mower unit 90.

The traveling machine body 10 is supported by a pair of the left and right driving wheels 30L and 30R. The traveling machine body 10 is provided with the motive power part 20 for driving the pair of left and right driving wheels 30L and 30R. To the back part of the traveling machine body 10, the riding part 40 on which the worker rides is connected. In both left and right ends of the riding part 40, the driven wheel 60L and the driven wheel 60R are provided respectively. To the upper part of the traveling machine body 10, the handle 70 is connected, and is provided so as to extend upward. To the front part of the traveling machine body 10, the mower unit 90 that is a work device for lawn mowing is connected.

In the traveling vehicle 1 thus configured, the worker rides on the riding part 40 to grip the handle 70 by a hand, so that the worker can stably ride on the traveling vehicle 1. Additionally, the worker performs predetermined operation, so that the worker can independently drive the pair of left and right driving wheels 30L and 30R to enable the traveling vehicle 1 to travel arbitrarily. That is, while arbitrarily steering the traveling vehicle 1 left and right, the worker can move the traveling vehicle 1 forward or backward, and turn the traveling vehicle 1 on the spot. Furthermore, the worker performs predetermined operation, so that the worker drives the mower unit 90 to enable lawn mowing work.

Hereinafter a configuration of each part of the traveling vehicle 1 is described.

The traveling machine body 10 shown in FIG. 1, FIG. 2, FIG. 4 to FIG. 8, FIG. 11, and FIG. 12 mainly includes a machine body frame 11, and a machine body cover 12.

The machine body frame 11 shown in FIG. 4 to FIG. 8 serves as a main structure of the traveling machine body 10. The machine body frame 11 mainly includes a lower frame 11a, side frames 11b, vertical frames 11c, an upper frame 11d, a front frame 11e, a handle supporting part 11f, and a spring supporting plate 11g. The lower frame 11a, the side frames 11b, and the upper frame 11d each are formed by properly bending a cylindrical member.

The lower frame 11a forms a bottom of the machine body frame 11. The lower frame 11a is formed in a substantially rectangular shape in plan view. Inside the lower frame 11a, a flat plate 11j is fixed. The flat plate 11j forms a bottom surface of the machine body frame 11. In rear ends of the lower frame 11a, connection brackets 11h for connecting the riding part 40 described later are provided.

The side frames 11b form both left and right parts of the machine body frame 11. The side frames 11b are formed in an inverted U-shape in side view. The respective side frames 11b are disposed on left and right sides of the machine body frame 11, and fixed to both left and right ends of the lower frame 11a.

The two vertical frames 11c are disposed on each of the left and right sides of the machine body frame 11, and are fixed to the side frames 11b and the lower frame 11a so as to connect upper ends of the side frames 11b and side parts of the lower frame 11a.

The upper frame 11d connects the left and right side frames 11b. The upper frame 11d is formed in an inverted U-shape in rear view (in front view). Both left and right ends of the upper frame 11d are fixed to the respective upper parts of the left and right side frames 11b.

The front frame 11e forms the front part of the machine body frame 11. The front frame 11e has a first end connected to a central part in the left and right direction of the upper frame 11d. The front frame 11e has a second end that extends downward in the front direction.

Figure 11:
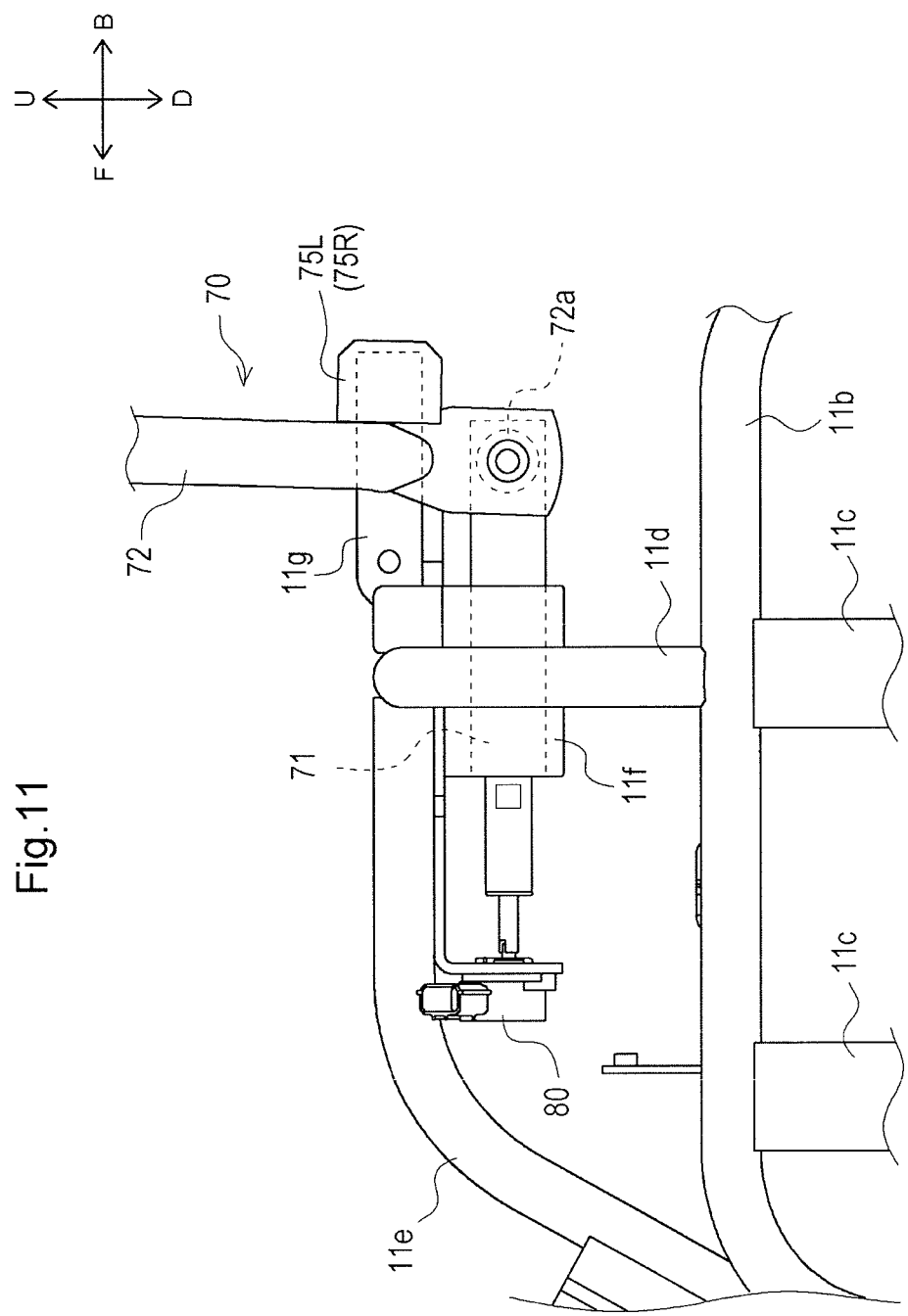
FIG. 11 is a side view showing a connecting part between a handle and the traveling machine body.
Figure 12:
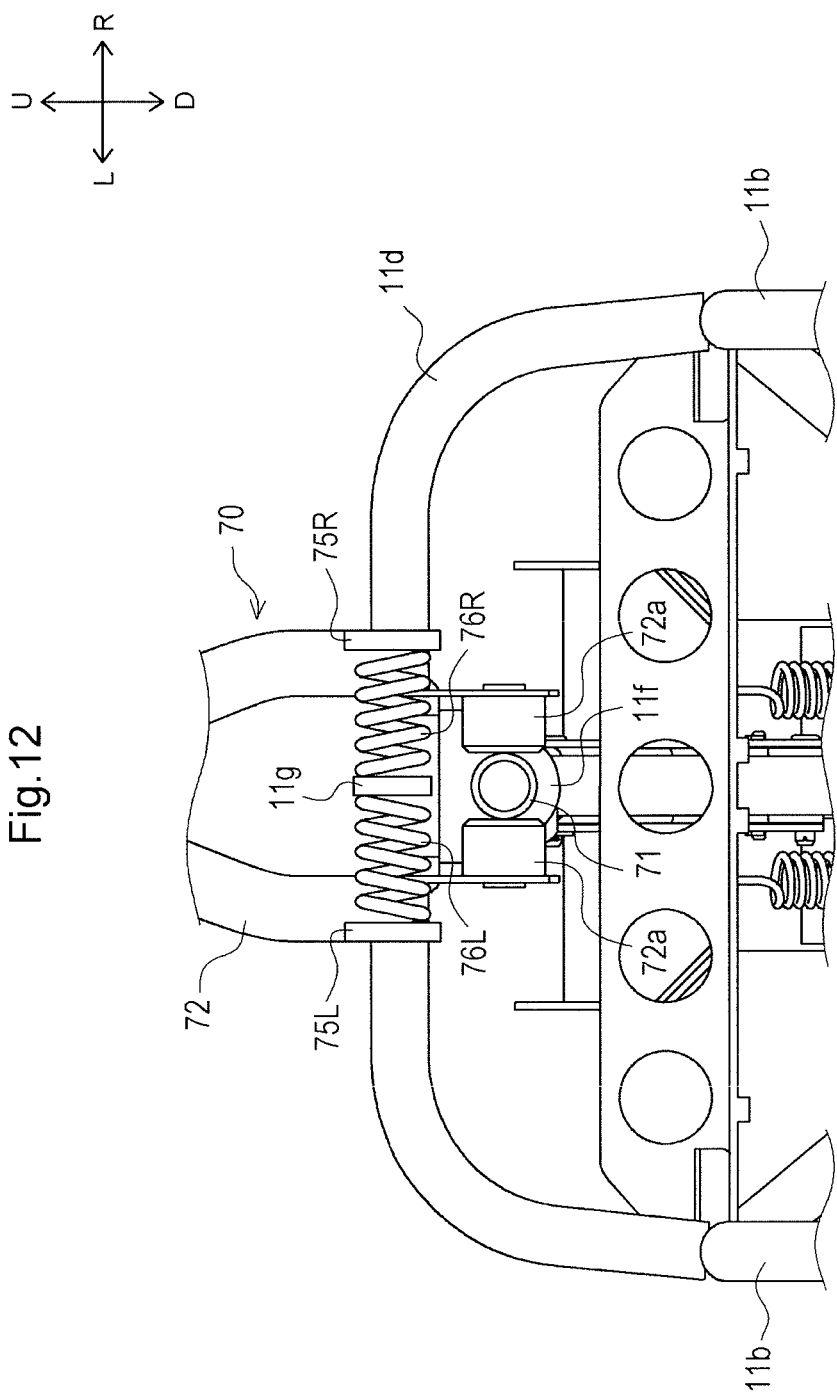
FIG. 12 is a rear view showing the connecting part.

The handle supporting part 11f shown in FIG. 11 and FIG. 12 is a part for supporting the handle 70 described later. The handle supporting part 11f is fixed to the lower part of the central part in the left and right direction of the upper frame 11d. The handle supporting part 11f is formed with a through hole in a front and back direction.

The spring supporting plate 11g is a rectangular plate-shaped member. The spring supporting plate 11g is fixed to the upper frame 11d so as to extend backward from the central part in the left and right direction of the upper frame 11d.

A space surrounded by the machine body frame 11 thus configured is a housing space S for housing component members of the motive power part 20 described later.

Figure 2:
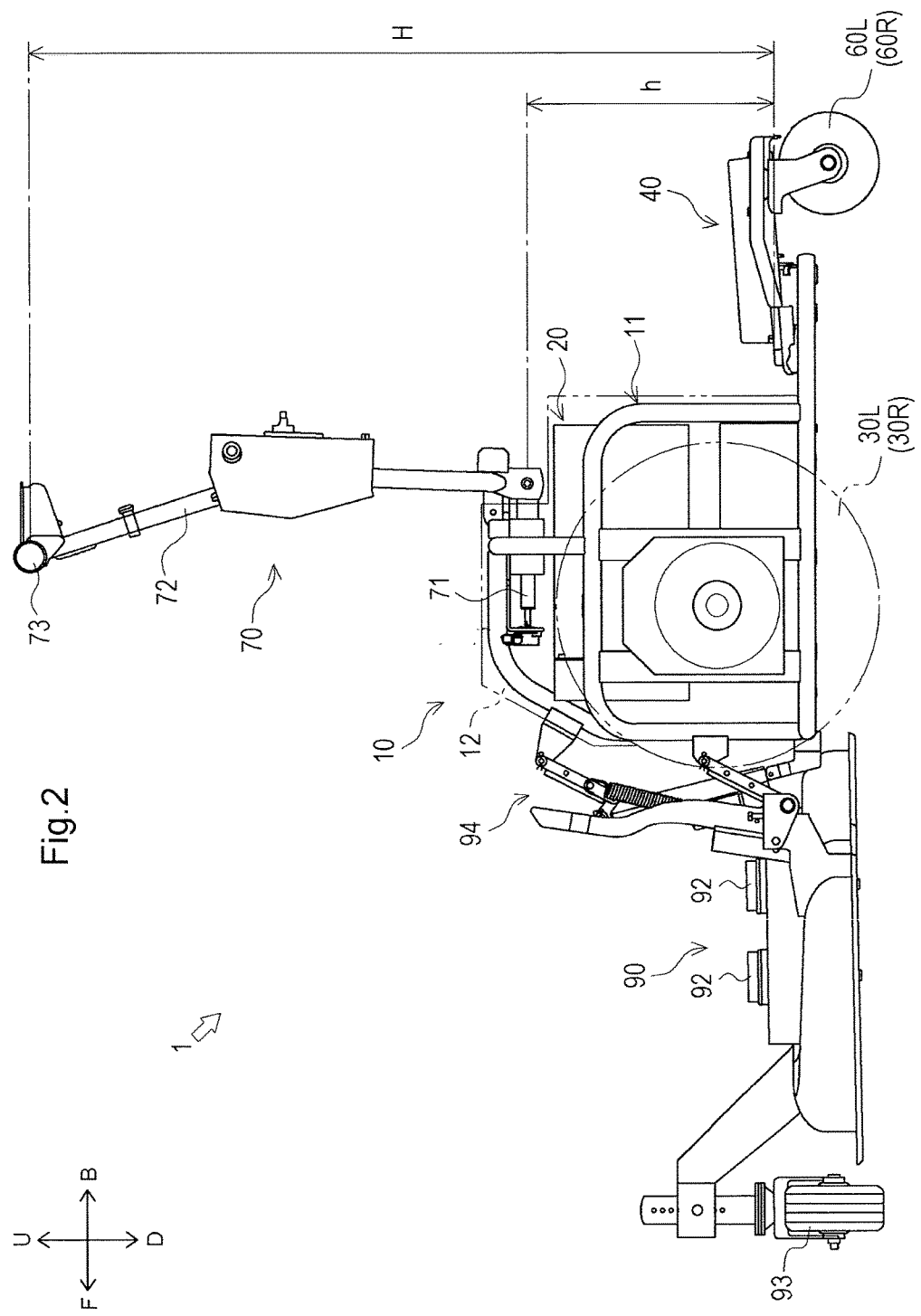
FIG. 2 is a side view of the traveling vehicle of this embodiment.

The machine body cover 12 shown in FIG. 1 and FIG. 2 is fixed to the machine body frame 11 so as to cover the housing space S of the machine body frame 11. The machine body cover 12 can conceals the machine body frame 11 and a device provided in the machine body frame 11 (motive power part 20 described below).

Figure 4:
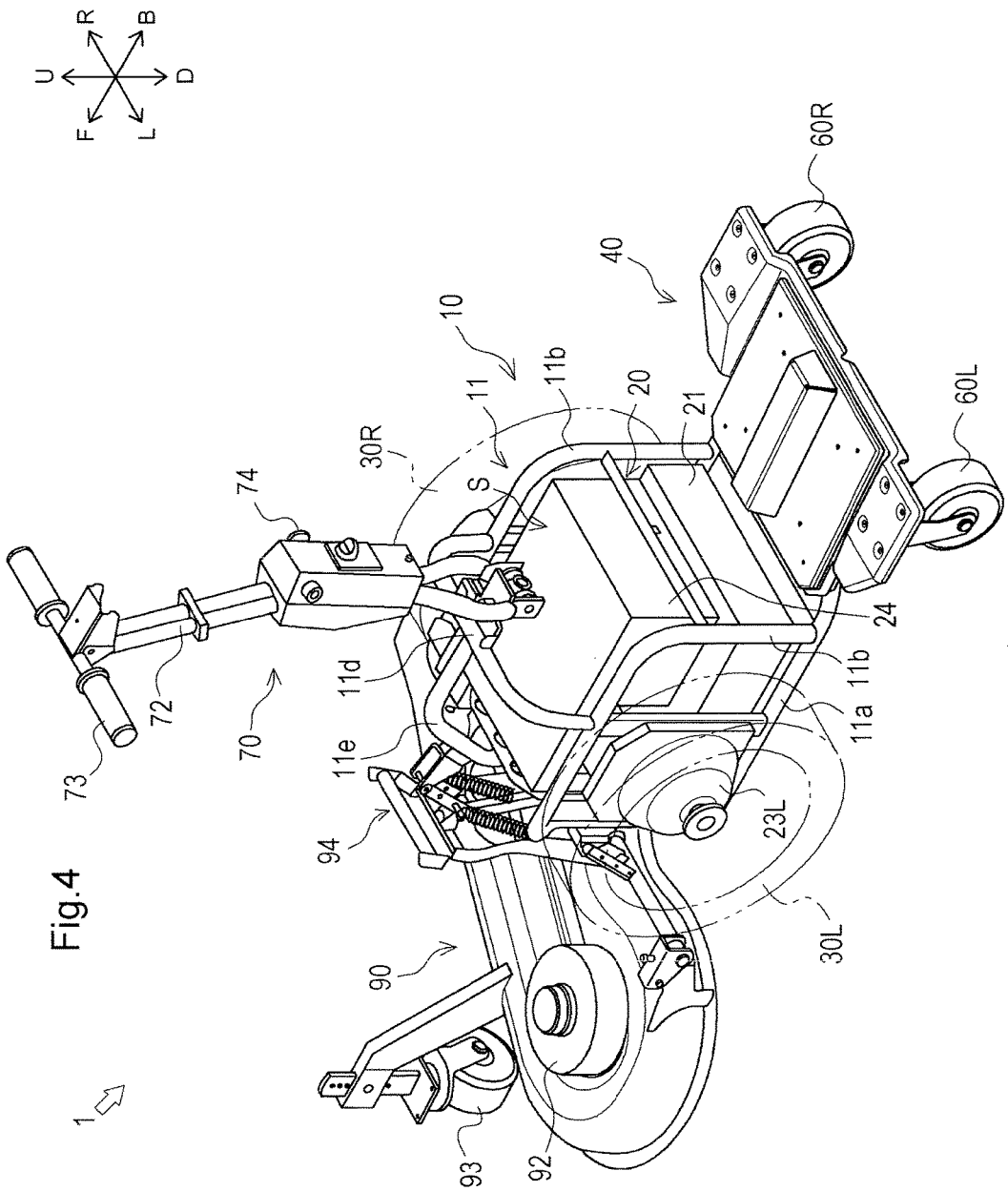
FIG. 4 is a back perspective view of the traveling vehicle.
Figure 6:
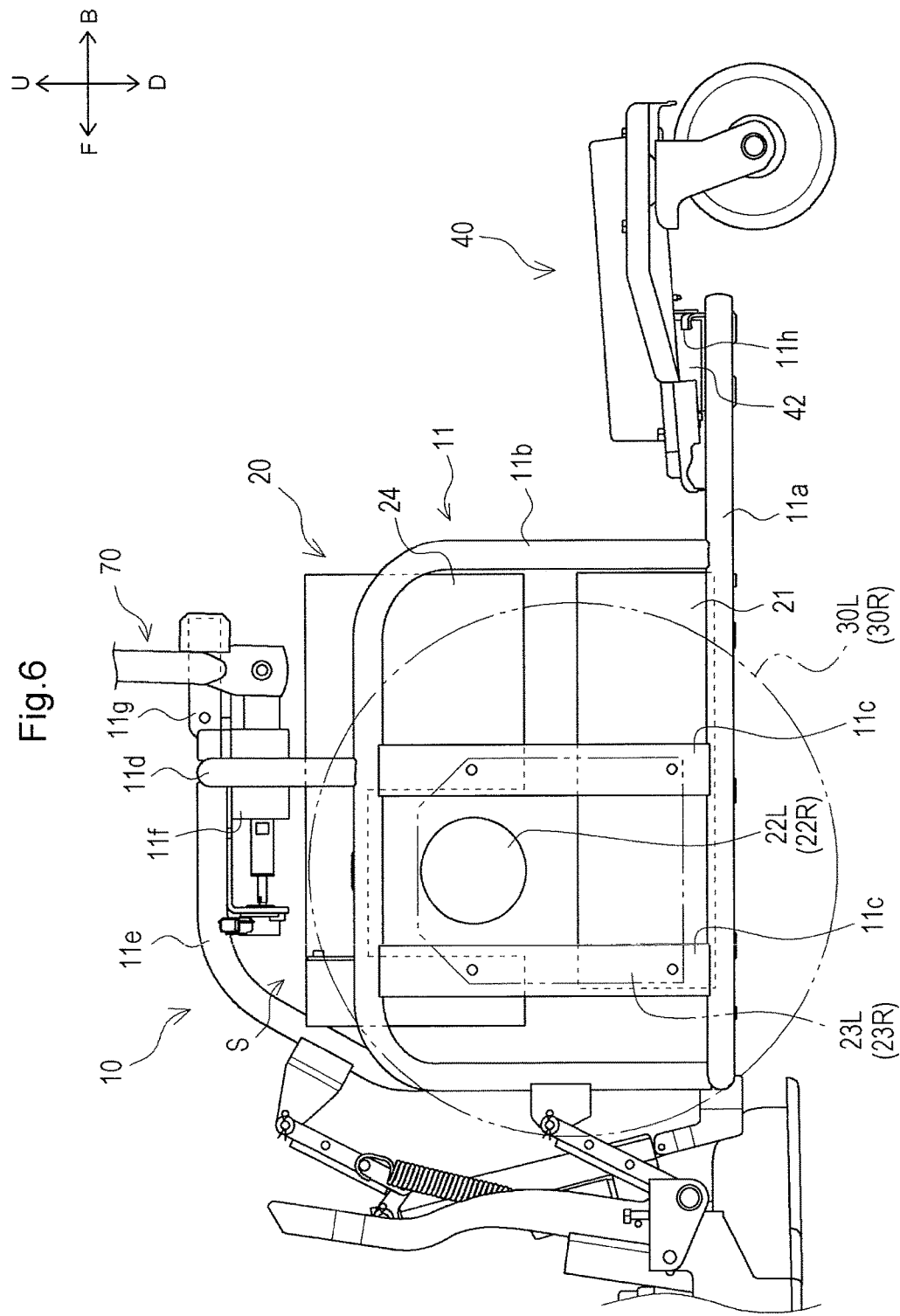
FIG. 6 is a side view showing a traveling machine body and a riding part.
Figure 7:
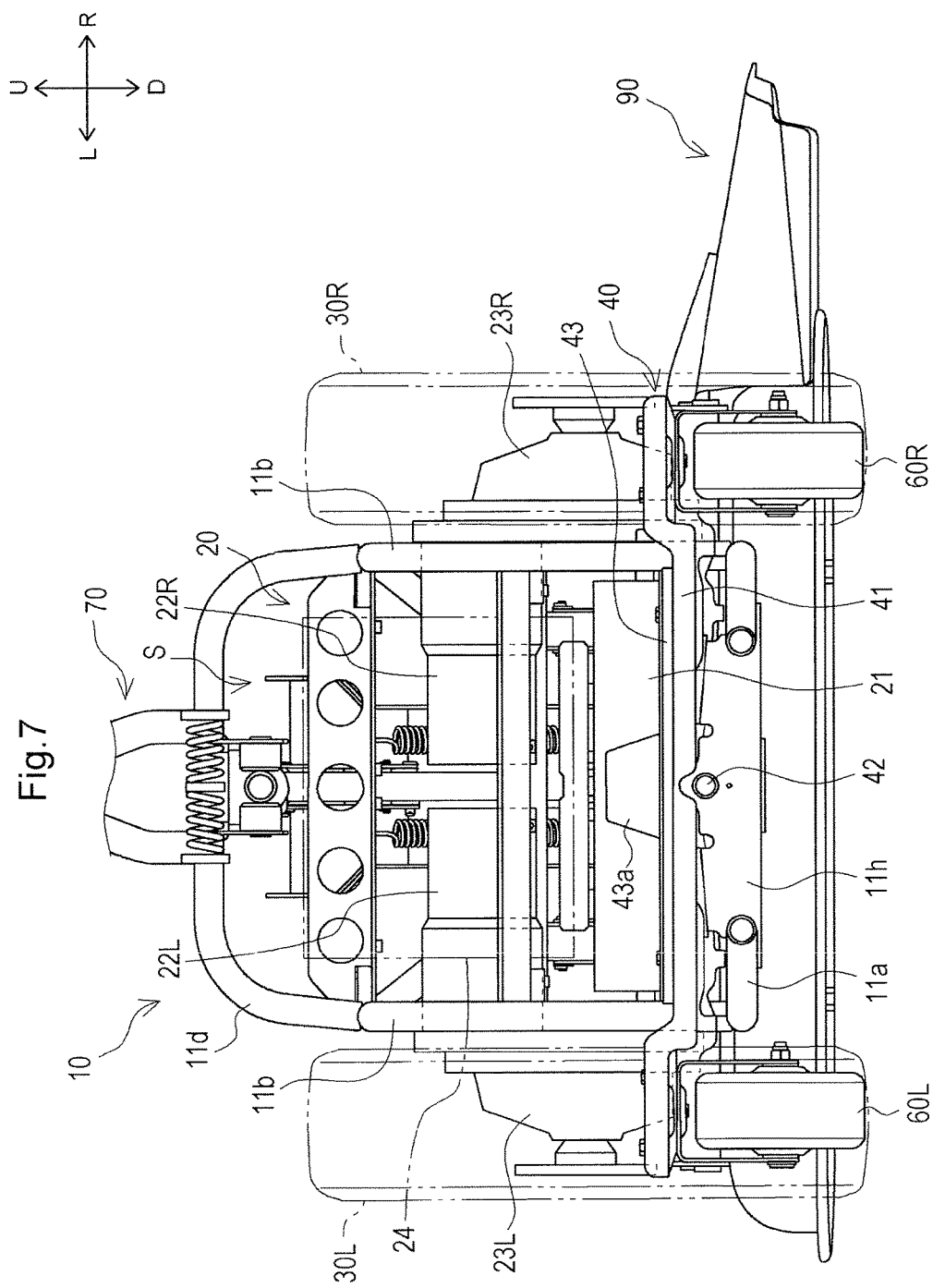
FIG. 7 is a rear view showing the traveling machine body and the riding par.
Figure 8:
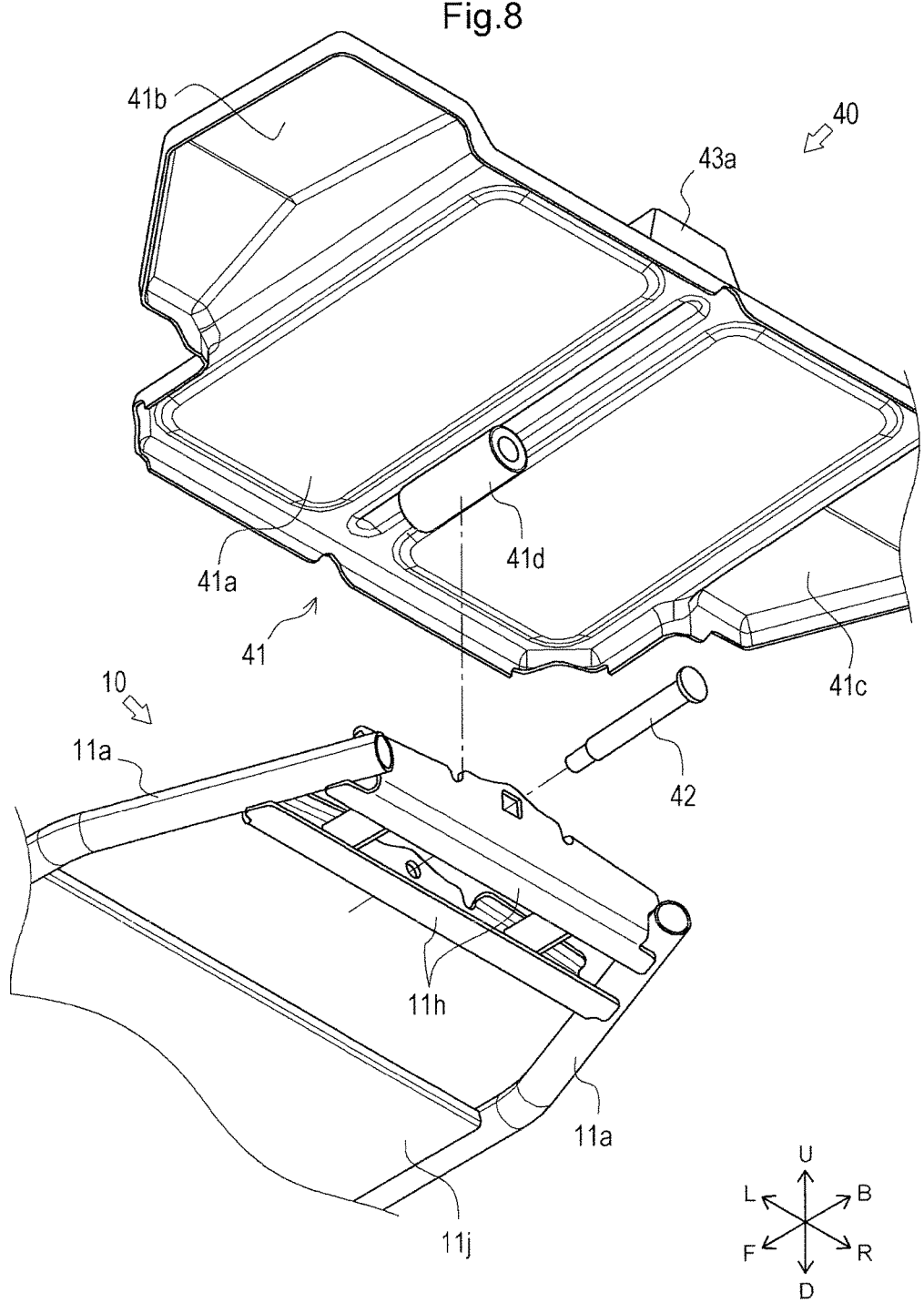
FIG. 8 is an exploded perspective view showing a machine body frame and the riding part.
Figure 9:
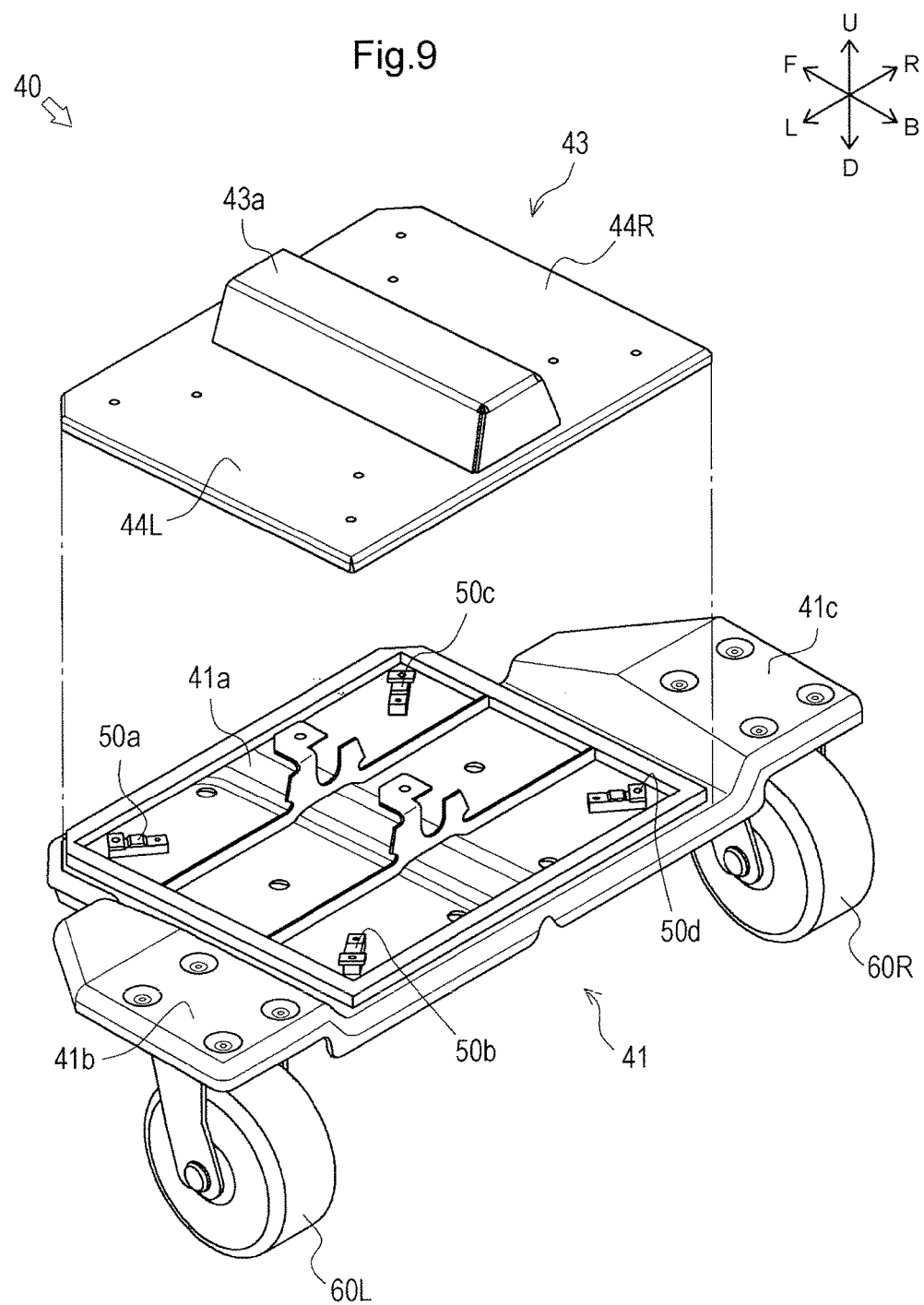
FIG. 9 is an exploded perspective view showing the riding part.
Figure 10:
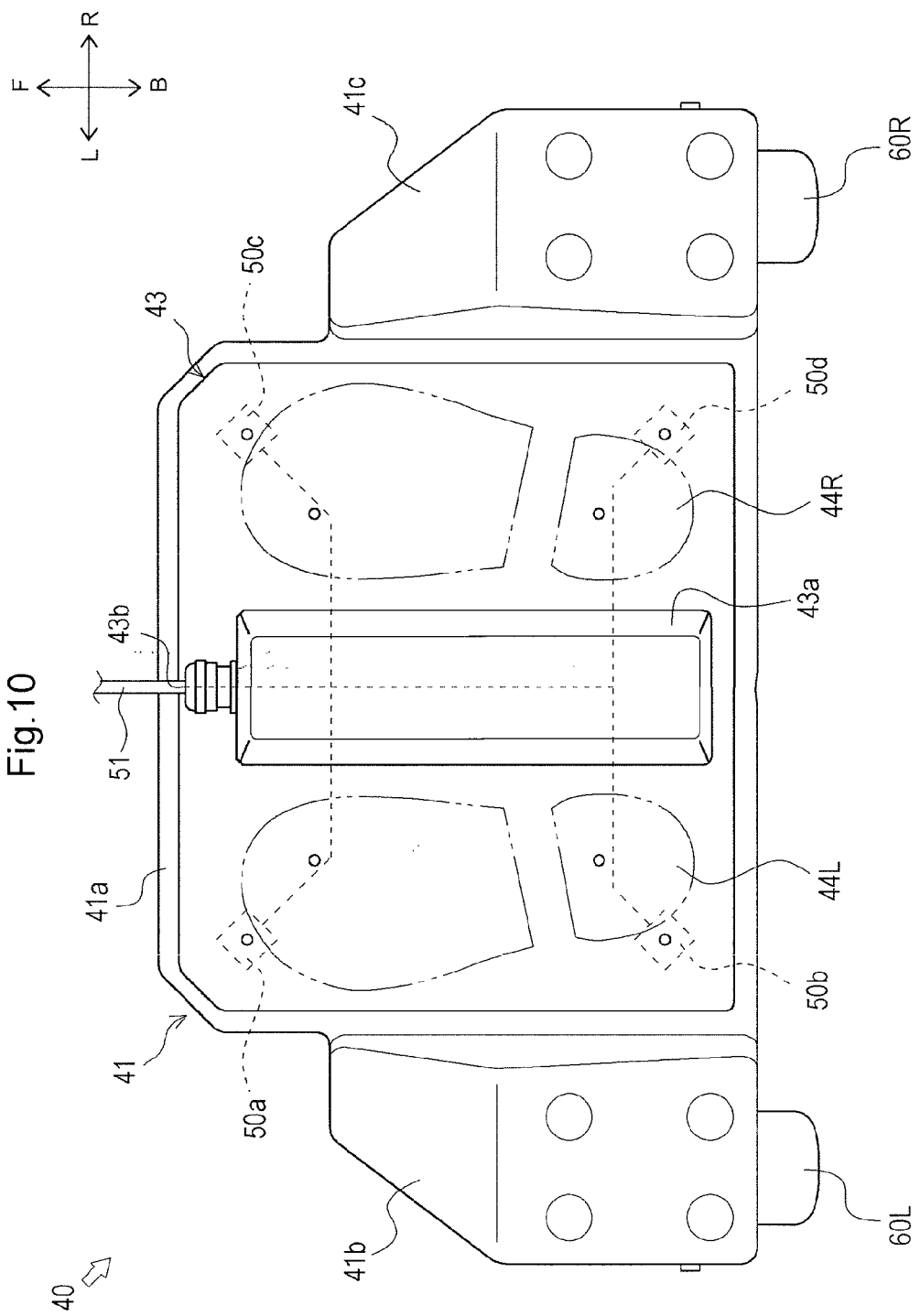
FIG. 10 is a plan view showing the riding part.

The motive power part 20 shown in FIG. 4, FIG. 6, and FIG. 7 generates power for driving the driving wheel 30L and the driving wheel 30R, and transmits the power to the driving wheel 30L and the driving wheel 30R. The motive power part 20 mainly includes a battery 21, a left motor 22L and a right motor 22R, a left power transmission mechanism 23L and a right power transmission mechanism 23R, and a controller box 24.

The battery 21 stores electric power for driving the traveling vehicle 1. The battery 21 is fixed onto the lower frame 11a of the machine body frame 11. The battery 21 is disposed in the lower part of the housing space S so as to range from the front end to the rear end of the housing space S.

The left motor 22L and the right motor 22R are an embodiment of a motor according to the disclosure, and are power sources for independently driving the pair of left and right driving wheels 30L and 30R, respectively. The left motor 22L and the right motor 22R can generate rotational power by using supplied electric power. The left motor 22L and the right motor 22R are disposed side by side on the left and right inside the housing space S, respectively. The left motor 22L and the right motor 22R are disposed on a substantially central part in a front and back direction of the housing space S right above the battery 21.

The left power transmission mechanism 23L and the right power transmission mechanism 23R are an embodiment of a power transmission mechanism according to the disclosure, and properly decelerate power from the left motor 22L and the right motor 22R, and thereafter transmit the decelerated power to the pair of left and right driving wheels 30L and 30R. The left power transmission mechanism 23L is connected to the left motor 22L to be fixed to the left side surface (vertical frame 11c) of the machine body frame 11. The right power transmission mechanism 23R is connected to the right motor 22R to be fixed to the right side surface (vertical frames 11c) of the machine body frame 11. The left power transmission mechanism 23L has an axle (output shaft) that is connected to the driving wheel 30l, and the right power transmission mechanism 23R has an axle that is connected to the driving wheel 30R. The axle of the left power transmission mechanism 23L and the axle of the right power transmission mechanism 23R are disposed on the same axis, and therefore the pair of left and right driving wheels 30L and 30R are disposed on the same axis.

The controller box 24 houses devices for controlling the driving of the traveling vehicle 1 (e.g., a controller 24a, a left inverter 24b, a right inverter 24c, a working inverter 24d, and the like which are described later). The controller box 24 is disposed in the upper part of the housing space S so as to range from the front to the back of the left motor 22L and the right motor 22R through the upper parts.

The controller 24a and the like housed in the controller box 24 are described later.

The driving wheel 30L and the driving wheel 30R support the traveling machine body 10, and rotate to allow to the traveling machine body 10 to travel. The driving wheel 30L and the driving wheel 30R support the traveling machine body 10 through the motive power part 20 (the left power transmission mechanism 23L and the right power transmission mechanism 23R).

Herein, in side view (see FIG. 6), a part of the component members of the motive power part 20 is disposed at such a position as to overlap with the driving wheel 30L and the driving wheel 30R. Specially, the left motor 22l, the right motor 22R, the left power transmission mechanism 23L, and the right power transmission mechanism 23R are disposed at such a position that the whole of the left motor 22L, the right motor 22R, the left power transmission mechanism 23l, and the right power transmission mechanism 23R overlaps with the driving wheel 30L and the driving wheel 30R. Thus, the component members of the motive power part 20 are disposed so as to overlap with the driving wheel 30L and the driving wheel 30R in side view, so that the traveling vehicle 1 can be made compact.

The riding part 40 shown in FIG. 7 to FIG. 10 is disposed behind the traveling machine body 10, is connected to the traveling machine body 10, and is configured to enable the riding of the worker. The riding part 40 mainly includes a first member 41 and a second member 43.

The first member 41 is a plate-shaped member. The first member 41 mainly includes a central part 41a, a left part 41b, and a right part 41c.

The central part 41a is a part formed in a rectangle in plan view. The left part 41b and the right part 41c are part formed by bending the left end and the right end of the first member 41 such that the left end and the right end rise.

On the bottom surface of the first member 41, a cylindrical connecting part 41d, the longitudinal direction of which is directed in the substantially front and back direction, is provided. A swinging shaft 42 is rotatably inserted into the connection brackets 11h of the machine body frame 11, and the connecting part 41d, so that the first member 41 is connected to the connection brackets 11h. The swinging shaft 42 is disposed such that the longitudinal direction of the swinging shaft 42 is directed in the substantially front and back direction. The first member 41 can swing to the left and right with respect to the traveling machine body 10 around the swinging shaft 42.

The second member 43 is a plate-shaped member. The second member 43 is formed in a rectangle that is one size smaller than the central part 41a of the first member 41, in plan view. In a central part in a left and right direction of the second member 43, a partition part 43a is formed. The partition part 43a is a part formed such that the central part in the left and right direction of the second member 43 rises from the front to the back. In the front end of the partition part 43a, an opening 43b that communicates the inside and the outside of the partition part 43a is formed. The partition part 43a partitions an upper surface of the second member 43 into the left and right. The surface on the left of the thus partitioned upper surface of the second member 43 serves as a left leg placing surface 44L for placing a left leg of the worker. Similarly, the surface on the right of the upper surface of the second member 43 serves as a right leg placing surface 44R for placing a right leg of the worker. The partition part 43a is formed in the second member 43, so that a part where the left leg of the worker is placed, and a part where the right leg is placed can be apparently distinguished. The second member 43 is disposed on the upper part of the central part 41a of the first member 41.

Between the first member 41 and the second member 43, a plurality of load sensors (a left front load sensor 50a, a left back load sensor 50b, a right front load sensor 50c, and a right back load sensor 50d) are disposed. The plurality of load sensors are an embodiment of a weight shift detection sensor according to the disclosure. Specifically, the second member 43 is placed an the plurality of load sensors disposed on the upper surface of the first member 41. The plurality of load sensors can detect a load applied to the second member 43 (specifically, a load by the worker who is riding an the second member 43).

The left front load sensor 50a is disposed near the front end of the left leg placing surface 44L of the second member 43 in plan view.

The left back load sensor 50b is disposed behind the left front load sensor 50a and near the rear end of the left leg placing surface 44L of the second member 43 in plan view.

The right front load sensor 50c is disposed near the front end of the right leg placing surface 44R of the second member 43 (at a position symmetrical to the left front load sensor 50a with the partition part 43a interposed between the right front load sensor 50c and the left front load sensor 50a) in plan view.

The right back load sensor 50d is disposed near the rear end of the right leg placing surface 44R of the second member 43 (at a position symmetrical to the left back load sensor 50b with the partition part 43a interposed between the right back load sensor 50d and the left back load sensor 50b) in plan view.

Thus, the left front load sensor 50a and the right front load sensor 50c, and the left back load sensor 50b and the right back load sensor 50d are disposed by being shifted in the front and back direction. Additionally, the left front load sensor 50a and the left back load sensor 50b, and the right front load sensor 50c and the right back load sensor 50d are disposed by being shifted in the left and right direction.

Wires 51 connected to the left front load sensor 50a, the left back load sensor 50b, the right front load sensor 50c, and the right back load sensor 50d are collected to the center in the left and right direction, and are guided forward through a space inside the partition part 43a of the second member 43. The wires 51 are guided to the outside of the partition part 43a through the opening 43b, to be connected to the controller 24a described later.

The driven wheel 60L and the driven wheel 60R support the riding part. The driven wheel 60L and the driven wheel 60R are provided below the left part 41b and the right part 41c of the first member 41, respectively. The driven wheel 60L and the driven wheel 60R are non-driving wheels, and can rotate while freely changing the direction in accordance with the movement of the traveling vehicle 1.

The handle 70 shown in FIG. 2 to FIG. 4, FIG. 11, and FIG. 12 is an embodiment of a handle and a holding part according to the disclosure, and is connected to the traveling machine body 10 so as to be swingable left and right with respect to the traveling machine body 10. The handle 70 mainly includes a fulcrum shaft 71, a handle main body 72, a grip part 73, and a work switch 74.

The fulcrum shaft 71 shown in FIG. 11 and FIG. 12 serves as a swing fulcrum of the handle 70. The fulcrum shaft 71 is rotatably inserted into the through hole of the handle supporting part 11f of the machine body frame 11 with the longitudinal direction of the fulcrum shaft 71 being directed in the front and back direction.

Figure 3:
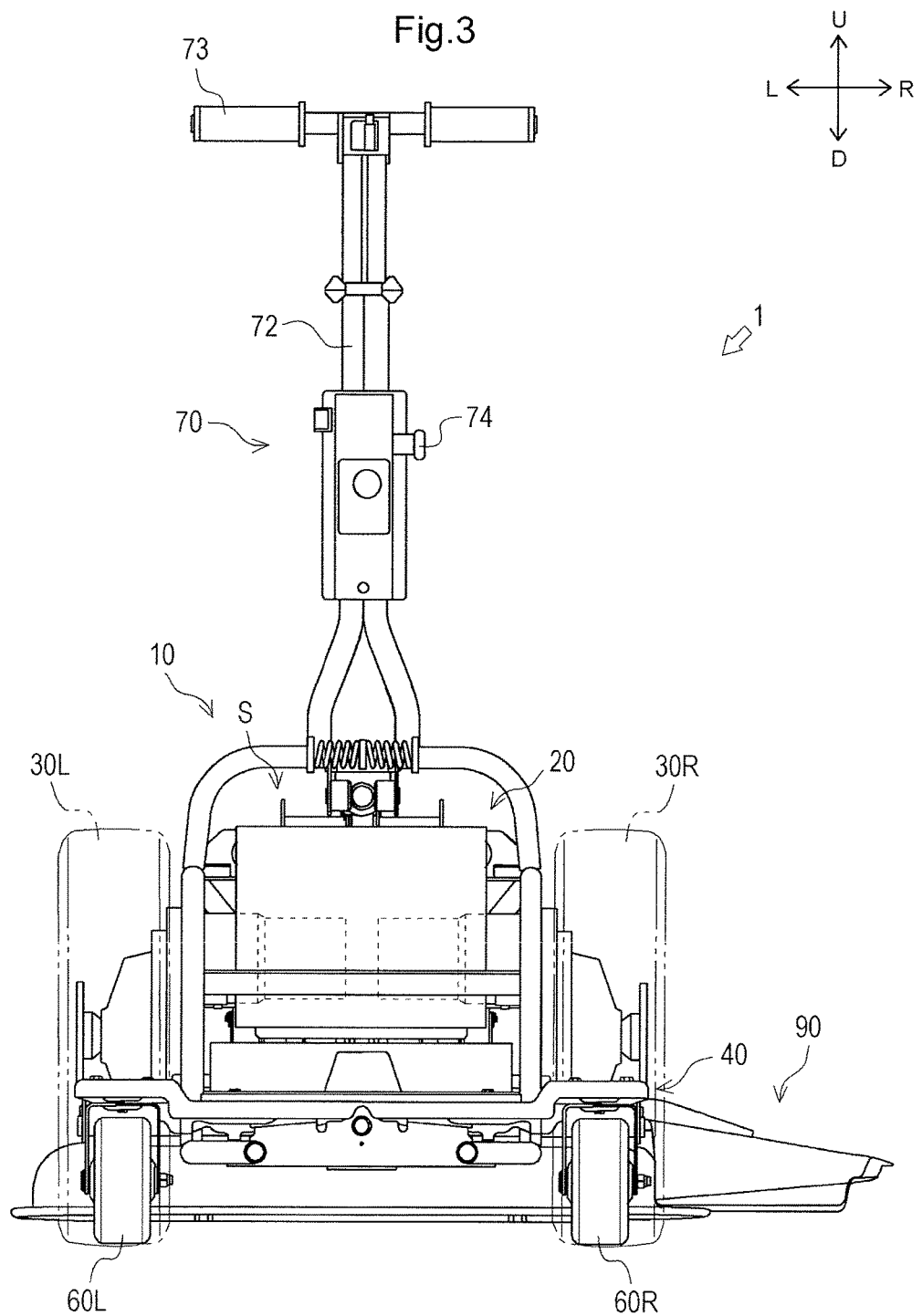
FIG. 3 is a rear view of the traveling vehicle.

The handle main body 72 shown in FIG. 2 to FIG. 4 is a main structure of the handle 70. The handle main body 72 is provided so as to extend upward from the rear upper part of the traveling machine body 10.

As shown in FIG. 11 and FIG. 12, a part near the lower end of the handle main body 72 is branched into the left and right, and the branched parts are fixed to the rear end of the fulcrum shaft 71 through a pair of left and right spacers 72a. Consequently, the handle main body 72 is connected to the traveling machine body 10 so as to be swingable left and right with respect to the traveling machine body 10.

In the part near the lower end of the handle main body 72 (above the fulcrum shaft 71), a pair of a left spring supporting plate 75L and a right spring supporting plate 75R is provided. The left spring supporting plate 75L and the right spring supporting plate 75R are disposed with the rear end of the spring supporting plate 11g of the machine body frame 11 between the left spring supporting plate 75L and the right spring supporting plate 75R. Between the left spring supporting plate 75L and the spring supporting plate 11g, a left spring 76L that is a compression coil spring is disposed. Between the right spring supporting plate 75R and the spring supporting plate 11g, a right spring 76R that is a compression coil spring is disposed. Spring constants of the left spring 76L and the right spring 76R are preset to the same value. The left spring 76L and the right spring 76R equally urge the handle main body 72 left and right, so that the handle main body 72 is held in an upright state.

The grip part 73 shown in FIG. 2 to FIG. 4 is a part where the worker who is riding on the riding part 40 can grip. The grip part 73 is formed so as to extend from the upper end of the handle main body 72 to the left and right. The height of the grip part 73 (i.e., the height of the upper end of the handle main body 72) is preset to a height allowing easy gripping of the worker who is riding on the riding part 40 (e.g., a height equal to the level of a chest of the worker (see FIG. 1)).

The work switch 74 is an operation tool for switching on and off of the operation of the mower unit 90 described later. The work switch 74 is provided in the middle in the vertical direction of the handle main body 72.

In the handle 70 thus configured, the worker can swingably operate the handle 70 (handle main body 72) left and right with the fulcrum shaft 71 as a swing fulcrum. At this time, the handle main body 72 is urged by the left spring 76L and the right spring 76R so as to return to the upright state (see FIG. 12). The larger the swinging operation amount of the handle main body 72 is, the larger the urging force is. Consequently, the worker can easily return the swung handle main body 72 to the upright state, and the operability of the handle 70 can be improved.

The fulcrum shaft 71 of the handle 70 is located above the motive power part 20 (the housing space S of the traveling machine body 10). That is, as shown in FIG. 2, the fulcrum shaft 71 is provided at such a position as to be higher than the leg placing surfaces (the left leg placing surface 44L and the right leg placing surface 44R) of the riding part 40. Specifically, the fulcrum shaft 71 is provided at a position of a height h from the leg placing surfaces of the riding part 40. The mounting position of the fulcrum shaft 71 is set such that this height h is at most a half of a height H from the leg placing surfaces of the riding part 40 to the grip part 73. Particularly, in this embodiment, the height h is set to at least one-third of the height H. That is, in this embodiment, a relation of $H/3 \leq h \leq H/2$ is established.

As shown in FIG. 11, to the front end of the fulcrum shaft 71, a rotation angle sensor 80 is connected. The rotation angle sensor 80 is an embodiment of a swinging operation detection sensor according to the disclosure. The rotation angle sensor 80 is configured by a potentiometer. The rotation angle sensor 80 is fixed to a part near the upper end of the front frame 11e, and is connected to the front end of the fulcrum shaft 71. Consequently, the rotation angle sensor 80 can detect the rotation angle of the fulcrum shaft 71, and also detect the swinging operation amount of the handle 70.

Figure 5:
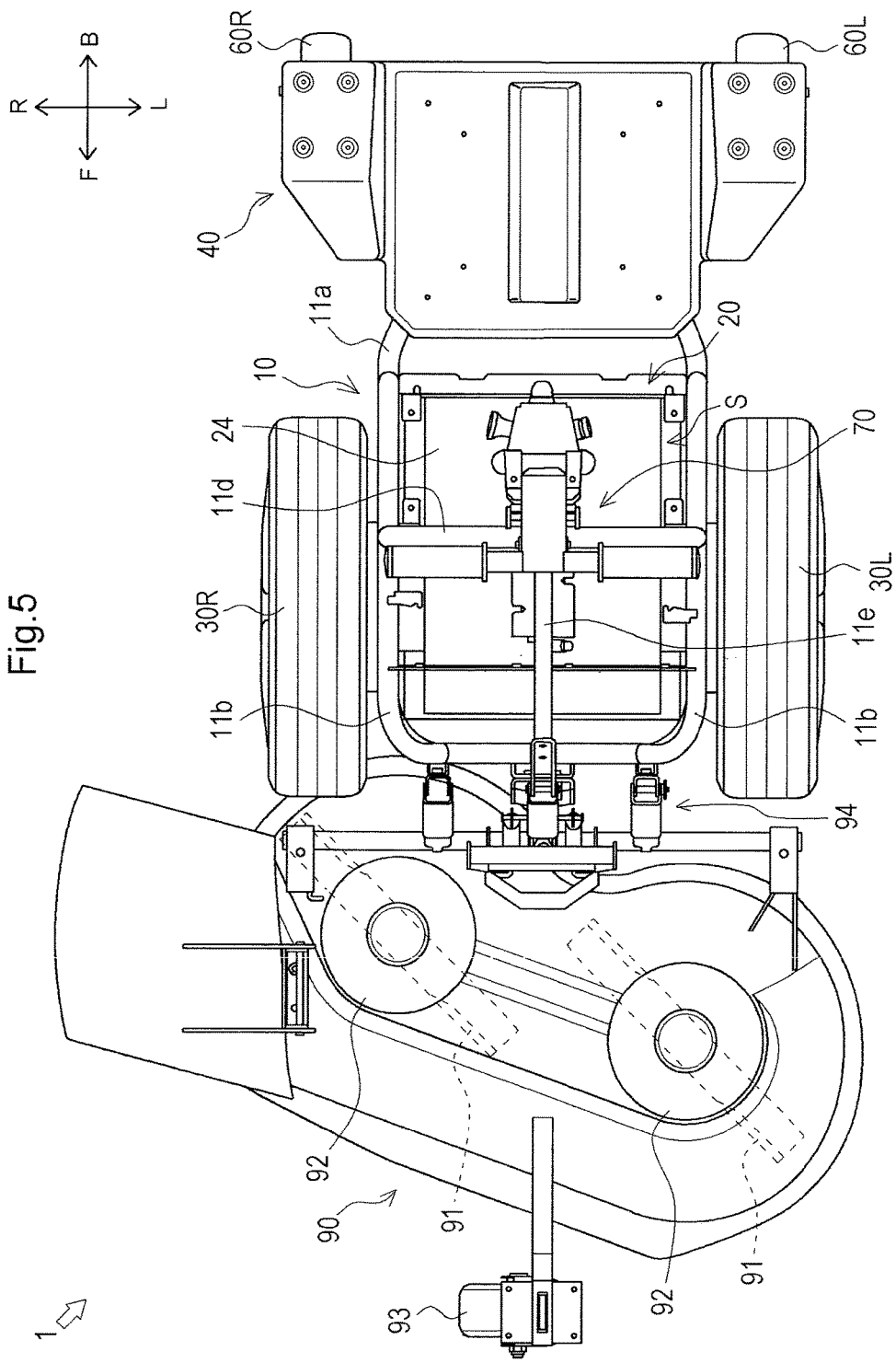
FIG. 5 is a plan view of the traveling vehicle.

The mower unit 90 shown in FIG. 2, FIG. 4 and FIG. 5 is an embodiment of a work device according to the disclosure, and is a work device for performing lawn mowing work. The mower unit 90 is disposed in front of the traveling machine body 10, and connected to the traveling machine body 10. The mower unit 90 mainly includes blades 91, blade motors 92, a gauge wheel 93, and a lifting and lowering link 94.

The mower unit 90 is provided with the two blades 91 rotatably. To the respective blades, the blade motors 92 for driving the blades 91 are connected. In the front end of the mower unit 90, the gauge wheel 93 capable of rotating while freely changing the direction in accordance with the movement of the traveling vehicle 1 is provided. The mower unit 90 is liftably connected to the traveling machine body 10 through the lifting and lowering link 94.

Figure 13:
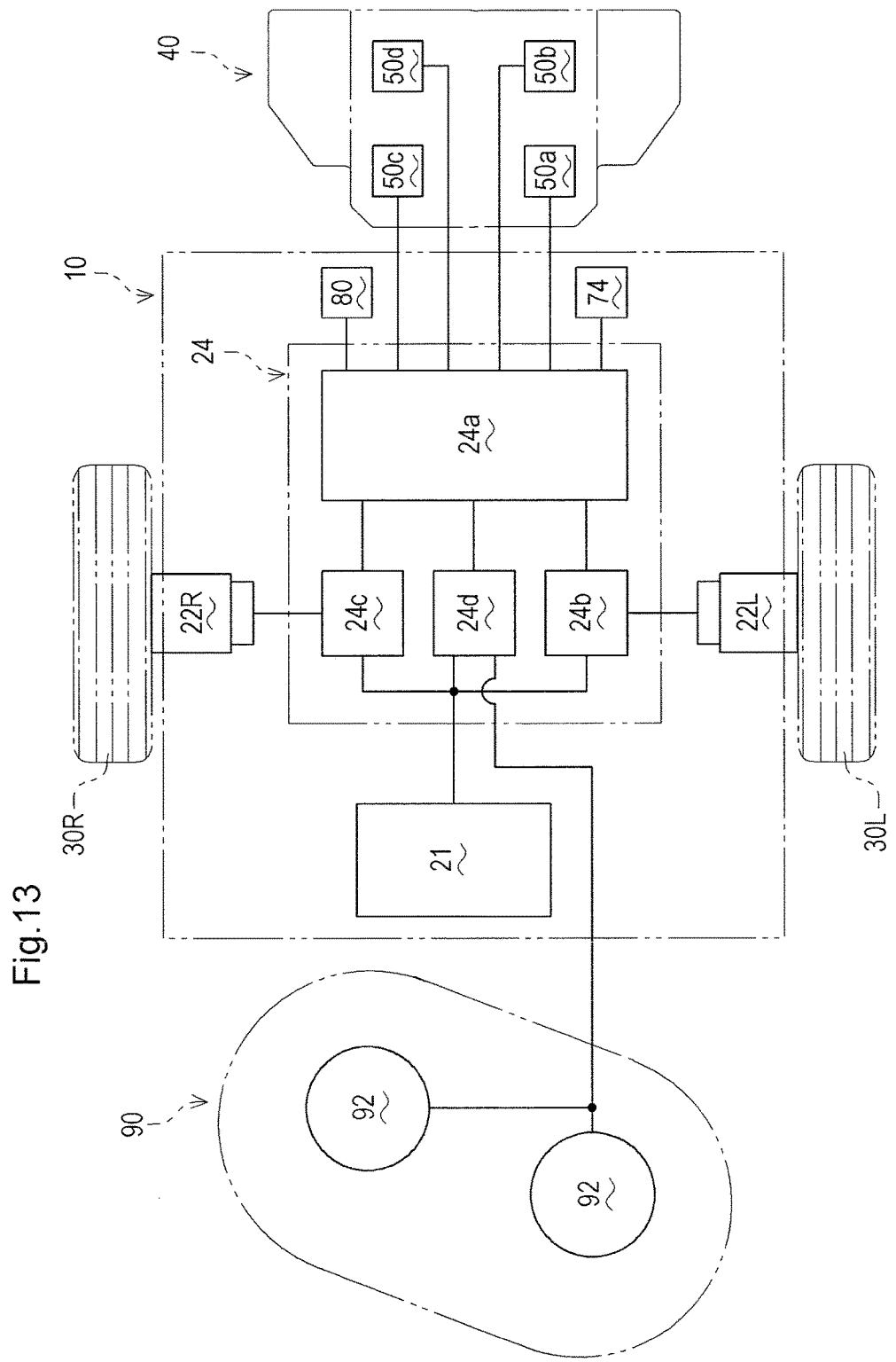
FIG. 13 is a schematic diagram showing a configuration related to the control of the traveling vehicle.

Hereinafter a configuration for controlling the driving of the traveling vehicle 1 is described with reference to FIG. 13.

The controller 24a controls the operation of each connected device. The controller 24a is configured by a storage part, an arithmetic processing part, and the like. The controller 24a stores a program for controlling each device and various data.

The controller 24a is connected to the left front load sensor 50a, the left back load sensor 50b, the right front load sensor 50c, and the right back load sensor 50d, and can receive results of loads detected by these load sensors.

The controller 24a is connected to the rotation angle sensor 80, and can receive a result of the swinging operation amount of the handle 70 detected by the rotation angle sensor 80.

The controller 24a is connected to the work switch 74, and can receive a signal related to the operation of the work switch 74.

The controller 24a is connected to the left inverter 24b, and can control the operation of the left inverter 24b. The controller 24a optionally supplies electric power from battery 21 to the left motor 22L through the left inverter 24b, so that the rotational speed of the driving wheel 30L can be optionally controlled.

The controller 24a is connected to the right inverter 24c, and can control the driving of the right inverter 24c. The controller 24a optionally supplies electric power from battery 21 to the right motor 22R through the right inverter 24c, so that the rotational speed of the driving wheel 30R can be optionally controlled.

The controller 24a is connected to the working inverter 24d, and can control the driving of the working inverter 24d. The controller 24a optionally supplies electric power from battery 21 to the blade motors 92 through the working inverter 24d, so that the blades 91 can be rotated to perform lawn mowing work.

Hereinafter control performed by the controller 24a when a worker drives the traveling vehicle 1 configured as described above is described.

In a case where the traveling vehicle 1 is driven, the worker rides on the riding part 40, and grips the grip part 73 of the handle 70 by a hand (see FIG. 1). At this time, a left leg and a right leg of the worker are placed on the left leg placing surface 44L and the right leg placing surface 44R, respectively (see FIG. 10).

When the worker shifts his/her weight forward and backward (specifically, applies his/her weight to toes or heels), the controller 24a moves the traveling vehicle 1 forward or backward based on the forward and backward weight shift of the worker. Hereinafter, specific description is made.

The controller 24a calculates a forward and backward weight shift of the worker based on loads always detected by the plurality of load sensors (the left front load sensor 50a, the left back load sensor 50b, the right front load sensor 50c, and the right back load sensor 50d). Specifically, the controller 24a calculates a weight shift of the worker from change of balance between a total value of loads detected by the left front load sensor 50a and the right front load sensor 50c, and a total value of loads detected by the left back load sensor 50b, and the right back load sensor 50d.

The detection values of the plurality of load sensors that are used as a reference of the calculation of the weight shift (detection values detected when the traveling vehicle does not move forward and backward) can be set by an arbitrary method. For example, the controller 24a can be configured to previously store the detection values, or store detection values of the plurality of load sensors detected when the worker rides on the riding part 40.

When determining that the weight shift of the worker occurs, the controller 24a supplies electric power to the left motor 22L and the right motor 22R to drive the driving wheel 30L and the driving wheel 30R. Specifically, in a case where a forward weight shift occurs, the controller 24a rotates the driving wheel 30L and the driving wheel 30R forward to move the traveling vehicle 1 forward. In a case where a backward weight shift occurs, the controller 24a rotates the driving wheel 30L and the driving wheel 30R backward to move the traveling vehicle 1 backward. Additionally, the controller 24a increases the rotational speeds of the driving wheel 30L and the driving wheel 30R as the weight shift amount of the worker is larger, and moves the traveling vehicle 1 forward or backward at a higher speed.

When the worker swings the handle 70 left and right, the controller 24a turns the traveling vehicle 1 left or right based on the swinging operation amount of the handle 70. Hereinafter, specific description is made.

The controller 24a supplies electric power to the left motor 22L and the right motor 22R based on the swinging operation amount of the handle 70 always detected by the rotation angle sensor 80, to drive the driving wheel 30L and the driving wheel 30R. Specifically, when the handle 70 is swingably operated left (see FIG. 14), the controller 24a rotates the driving wheel 30L backward, and rotates the driving wheel 30R forward, to turn the traveling vehicle 1 in the left direction on the spot. Additionally, when the handle 70 is swingably operated right, the controller 24a rotates the driving wheel 30L forward, and rotates the driving wheel 30R backward, to turn the traveling vehicle 1 in the right direction on the spot.

Furthermore, when the weight shift of the worker and the swinging operation of the handle 70 are performed at the same time, the controller 24a can turn the traveling vehicle 1 left or right while moving the traveling vehicle 1 forward or backward (i.e., turn to the left or the right). Thus, the worker performs the weight shift and the swinging operation of the handle 70, so that the worker can intuitively drive the traveling vehicle 1.

When the worker operates the work switch 74 (ON operation), the controller 24a supplies electric power to the blade motors 92 to rotate the blades 91. The traveling vehicle 1 is allowed to travel in this state, so that lawn mowing work can be performed. Furthermore, when the worker operates the work switch 74 (OFF operation), the controller 24a stops supplying electric power to the blade motors 92, to stop rotating the blades 91.

Hereinafter, a relation between an inclination of the handle 70 and posture of the worker when the handle 70 is swingably operated is described.

Figure 14:
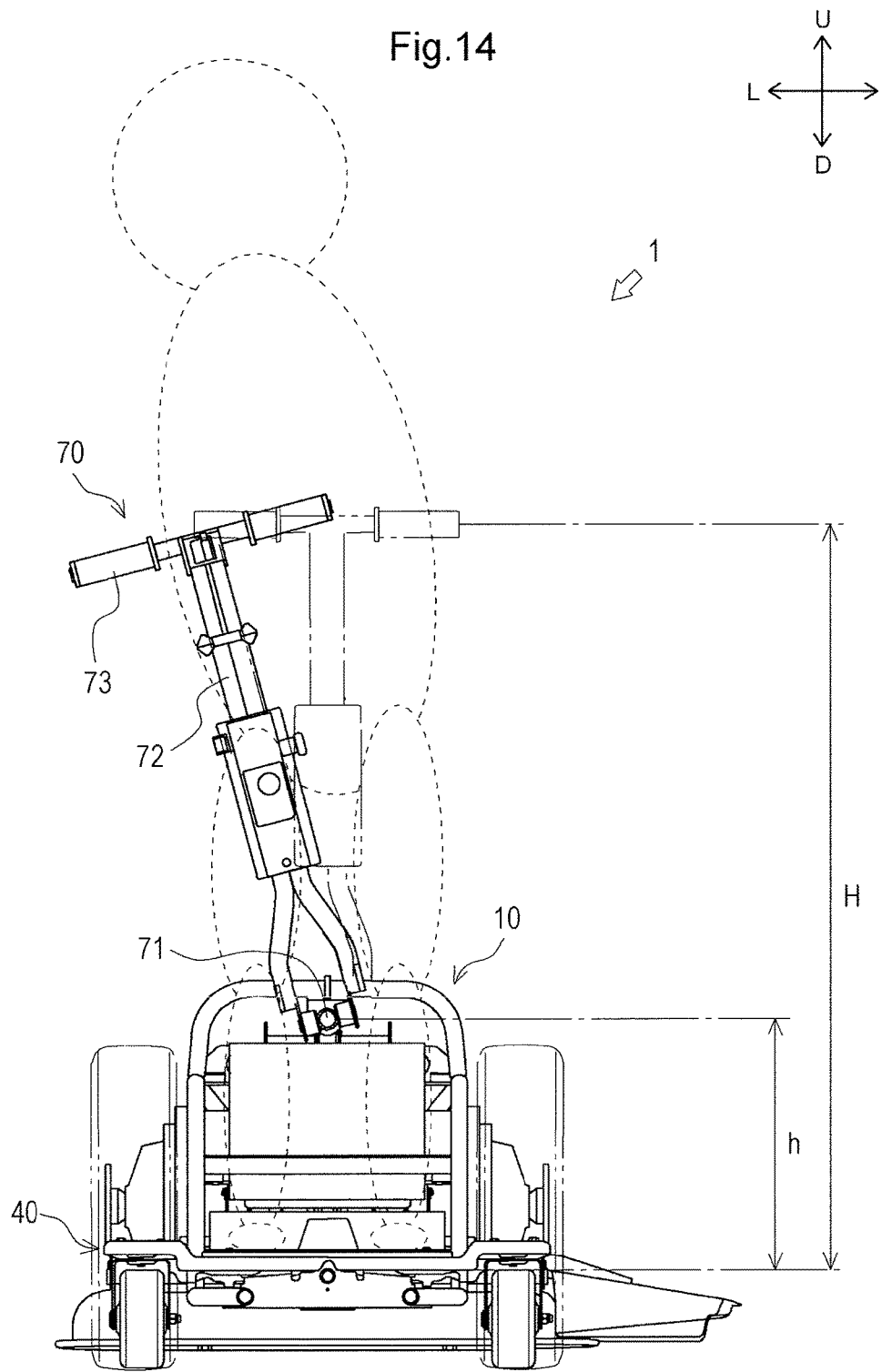
FIG. 14 is a rear view showing a state where the worker swings the handle left.

As shown in FIG. 14, the height h of the fulcrum shaft 71, which serves as the swing fulcrum of the handle 70, from the leg placing surfaces is set to a height ranging from at most a half of the height H of the grip part 73 from the leg placing surfaces to at least one-third of the height H.

Thus, the swing fulcrum of the handle 70 is disposed at a position as low as possible, so that a difference between an inclination angle of the handle 70 to the left and right and an inclination angle of the posture of the worker to the left and right when the handle 70 is swingably operated can be reduced. Consequently, it is possible to eliminate uncomfortable feeling when the handle 70 is operated, and to improve the operability of the handle 70.

Furthermore, the height h from the leg placing surfaces to the swing fulcrum of the handle 70 is secured to the minimum (at least H/3), so that a space for disposing other devices can be secured below the handle 70. In this embodiment, the motive power part 20 is disposed below the handle 70, so that the traveling vehicle 1 can be made compact.

Hereinafter a second embodiment of the traveling vehicle according to the disclosure is described.

Although the riding part 40 according to the first embodiment is configured to detect a weight shift of a worker by using the plurality of load sensors, the riding part can be configured to detect the weight shift of a worker by using a rotation angle sensor 52.

Figure 15A:
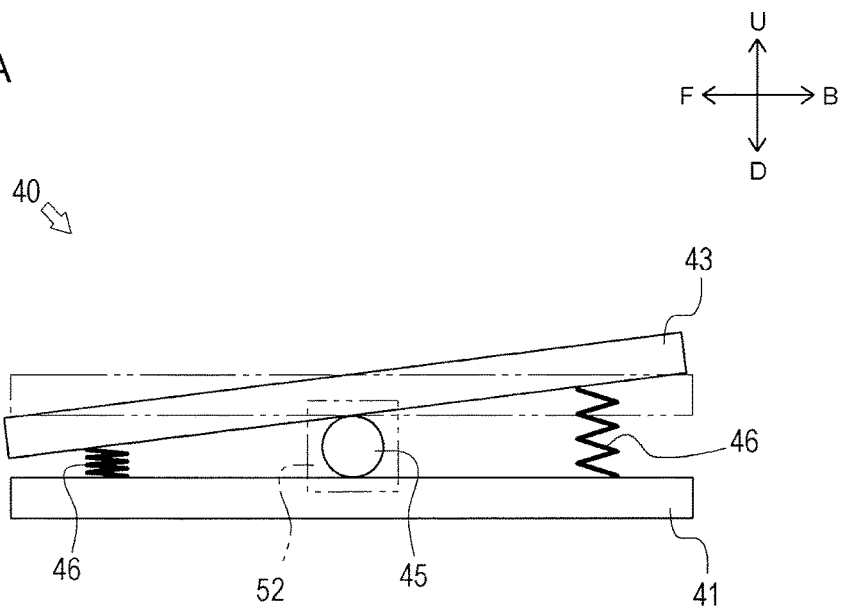
FIG. 15A is a schematic side view showing a riding part according to a second embodiment.

Specifically, as shown in FIG. 15A, a second member 43 is rotatably connected to an upper part of a first member 41 through a rotation shaft 45. The rotation shaft 45 is disposed in a central part in a front and back direction of the second member 43 with a longitudinal direction of the rotation shaft 45 being directed to a left and right direction. The rotation shaft 45 is fixed to the second member 43 to be integrally rotatable with the second member 43. The second member 43 can rotate (swing) forward and backward by the weight shift of a worker who is riding on the second member 43. Below both front and rear ends of the second member 43, respective springs 46 are disposed. The springs 46 urge the second member 43 such that the second member 43 returns to a position parallel to the first member 41. The rotation shaft 45 is provided with the rotation angle sensor 52. The rotation angle sensor 52 can detect the rotation angle of the rotation shaft 45, and can also detect a swing angle of the second member 43 with respect to the first member 41.

A controller 24a can calculate the weight shift of the worker from the swing angle of the second member 43 detected by the rotation angle sensor 52. The controller 24a can drive a driving wheel 30L and a driving wheel 30R based on the calculated weight shift of the worker to move the traveling vehicle 1 forward or backward.

Hereinafter a third embodiment of the traveling vehicle according to the disclosure is described.

Although the riding part 40 according to the second embodiment is configured to detect the weight shift of a worker by using the rotation angle sensor 5Z the riding part can be configured to detect the weight shift of a worker by using limit switches 53.

Figure 15B:
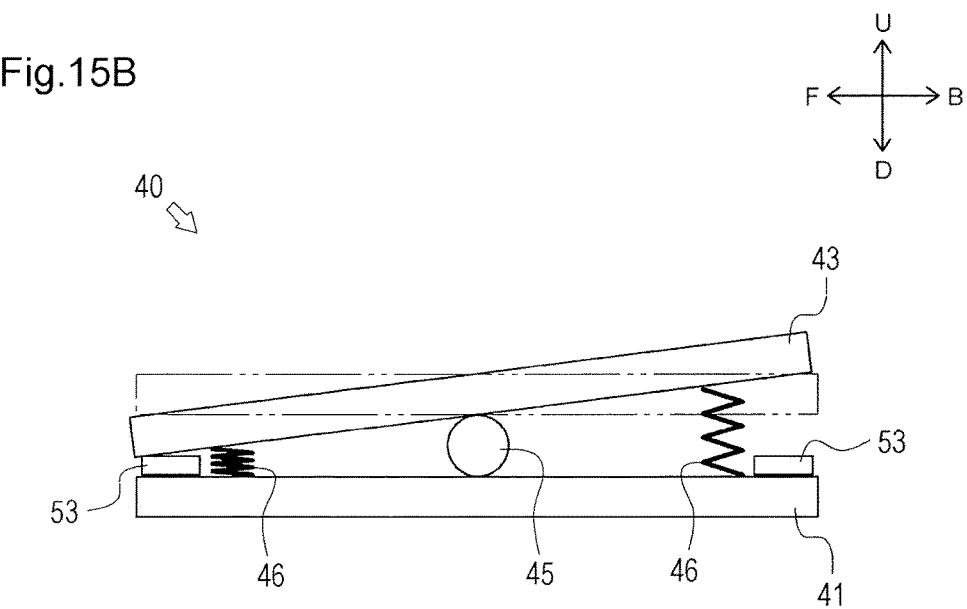
FIG. 15B is a schematic side view showing a riding part according to a third embodiment.

Specifically, as shown in FIG. 15B, in a front end and a rear end of an upper surface of a first member 41, the contact type limit switches 53 are disposed. When a second member 43 swings forward and backward by a predetermined angle with respect to the first member 41, the front end or the rear end of the second member 43 comes into contact with the limit switch 53. Consequently, it is possible to detect that the second member 43 swings forward or backward with respect to the first member 41.

In a case where a controller 24a detects that the second member 43 swings forward, the controller 24a rotates a driving wheel 30L and a driving wheel 30R forward to move a traveling vehicle 1 forward. Additionally, in a case where the controller 24a detects that the second member 43 swings backward, the controller 24a rotates the driving wheel 30L and the driving wheel 30R backward to move the traveling vehicle 1 backward.

Although the contact type limit switches 53 are used in the third embodiment, another sensor (a contact type sensor or a noncontact type sensor) can be used.

Hereinafter, a fourth embodiment of the traveling vehicle according to the disclosure is described.

Although the traveling vehicle 1 according to the first embodiment is configured to turn left or right based on the swinging operation amount of the handle 70, the traveling vehicle 1 can be configured to turn left or right based on the weight shift of a worker. Hereinafter, specific description is made with reference to FIG. 10.

A controller 24a calculates a forward and backward weight shift and a leftward and rightward weight shift of a worker based on loads always detected by a plurality of load sensors. Specifically, the controller 24a calculates the forward and backward weight shift of the worker from change of balance between a total value of loads detected by the left front load sensor 50a and the right front load sensor 50c, and a total value of loads detected by the left back load sensor 50b and the right back load sensor 50d. Additionally, the controller 24a calculates the leftward and rightward weight shift of the worker from change of balance between a total value of loads detected by the left front load sensor 50a and the left back load sensor 50b, and a total value of loads detected by the right front load sensor 50c and the right back load sensor 50d.

In a case where the controller 24a determines that the forward and backward weight shift occurs, the controller 24a drives a driving wheel 30L and a driving wheel 30R to move a traveling vehicle 1 forward or backward. The controller 24a moves the traveling vehicle 1 forward or backward at a higher speed as the forward and backward weight shift amount is larger.

In a case where the controller 24a determines that the leftward and rightward weight shift occurs, the controller 24a rotates the driving wheel 30L and the driving wheel 30R in the opposite directions, to turn the traveling vehicle 1 left or right. The controller 24a turns the traveling vehicle 1 left or right at a higher speed as the leftward and rightward weight shift amount is larger.

Furthermore, in a case where the forward and backward weight shift and the leftward and rightward weight shift are performed at the same time, the controller 24a can turn the traveling vehicle 1 left and right while moving the traveling vehicle 1 forward or backward (i.e., turn to the left or the right). Thus, the worker can intuitively drive the traveling vehicle 1 only by weight shift.

In the traveling vehicle 1 according to the fourth embodiment, the driving wheel 30L and the driving wheel 30R are not controlled based on the swinging operation amount of a handle 70. Thus, the handle 70 may be fixed to the traveling machine body 10 so as not to be swingable.

In the fourth embodiment, the traveling vehicle 1 is turned left or right only by the leftward and rightward weight shift of a worker. However, in addition to the above, the traveling vehicle 1 can be configured to be turned left or right based on the leftward and rightward swinging operation amount of the handle 70. For example, the traveling vehicle 1 can be configured to be slowly turned, in a case where only a leftward and rightward weight shift is detected. Additionally, the traveling vehicle 1 can be configured to be quickly turned, in a case where the swinging operation of the handle 70 is detected in addition to the leftward and rightward weight shift.

Hereinafter a fifth embodiment of the traveling vehicle according to the disclosure is described.

Although the riding part 40 according to the fourth embodiment is configured such that the weight shift of a worker is detected by using the plurality of load sensors, the riding part can be configured such that the weight shift of a worker is detected by using a first rotation angle sensor 54a and a second rotation angle sensor 54b.

Figure 16A:
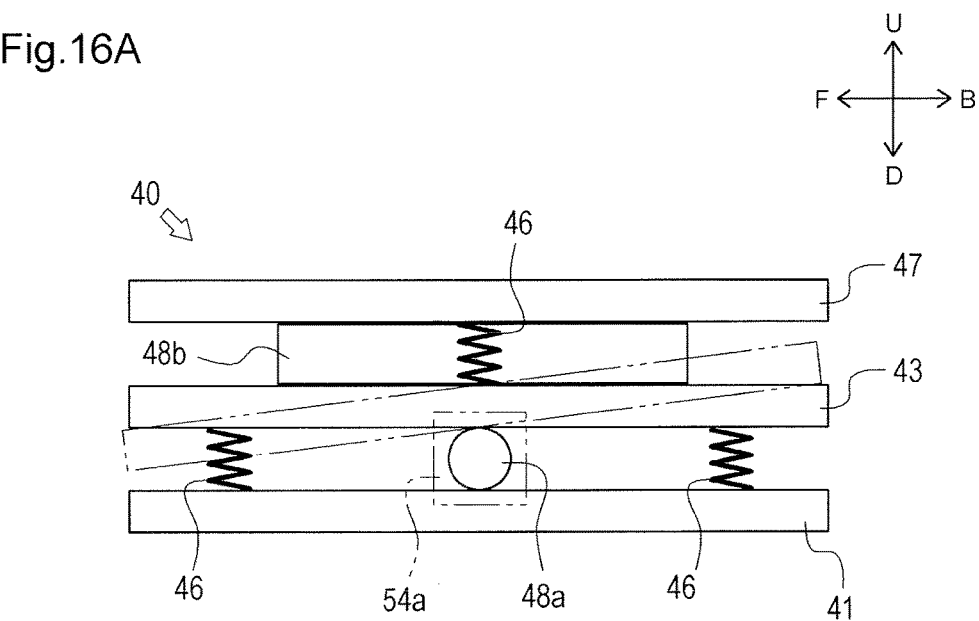
FIG. 16A is a schematic side view showing a riding part according to a fifth embodiment.
Figure 16B:
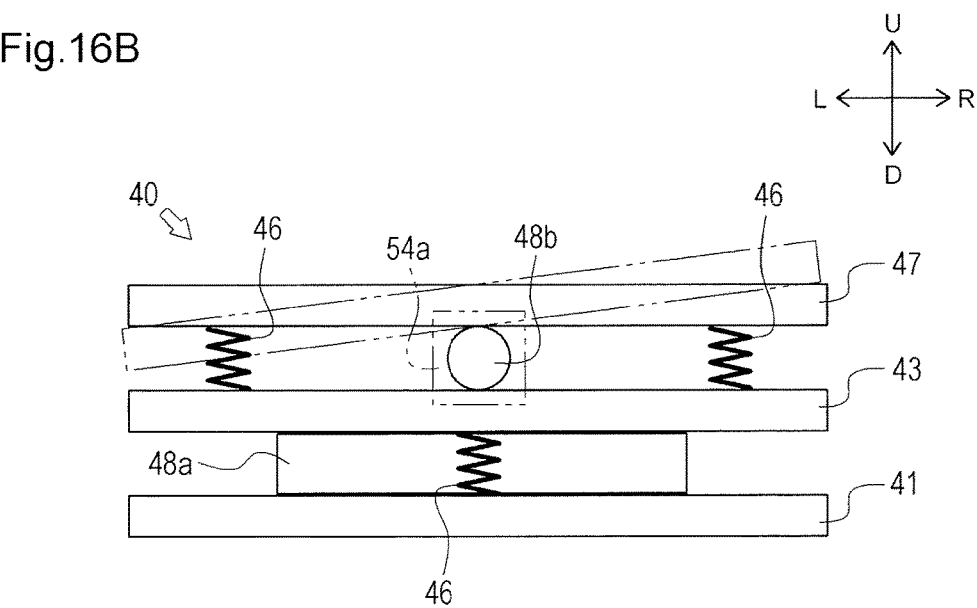
FIG. 16B is a schematic rear view showing the riding part.

Specifically, as shown in FIGS. 16A and 16B, a third member 47 is provided above a second member 43 of a riding part 40. Between a first member 41 and the second member 43, a rotation shaft 48a is provided. The second member 43 can swing forward and backward with respect to the first member 41 around the rotation shaft 48a. The rotation shaft 48a is provided with the first rotation angle sensor 54a, and the swing angle of the second member 43 can be detected. Additionally, between the second member 43 and the third member 47, a rotation shaft 48b is provided. The third member 47 can swing to the left and right with respect to the second member 43 around the rotation shaft 48b. The rotation shaft 48b is provided with the second rotation angle sensor 54b, and the swing angle of the third member 47 can be detected. Below both the front and rear ends of the second member 43 (between the second member 43 and the first member 41), respective springs 46 are disposed. The springs 46 urge the second member 43 such that the second member 43 returns to a position parallel to the first member 41. Additionally, below both the left and right ends of the third member 47 (between the third member 47 and the second member 43), respective springs 46 are disposed. The springs 46 urge the third member 47 such that the third member 47 returns to a position parallel to the second member 43.

In the riding part 40 thus configured, a worker rides on the third member 47. A controller 24a can calculate the forward and backward weight shift of the worker from the swing angle of the second member 43 detected by the first rotation angle sensor 54a. Additionally, the controller 24a can calculate the leftward and rightward weight shift of the worker from the swing angle of the third member 47 detected by the second rotation angle sensor 54b.

Although the first rotation angle sensor 54a and the second rotation angle sensor 54b are used in the fifth embodiment, the forward and backward weight shift and the leftward and rightward weight shift of the worker can be detected by using limit switches, similarly to a third embodiment.

Hereinafter, a sixth embodiment of the traveling vehicle according to the disclosure is described.

In the riding part 40 according to the fifth embodiment, the member on which a worker rides (third member 47) is swingable forward and backward, and to the left and right by using the rotation shafts (the rotation shaft 48a and the rotation shaft 48b). However, a ball joint 49 can be used.

Figure 17:
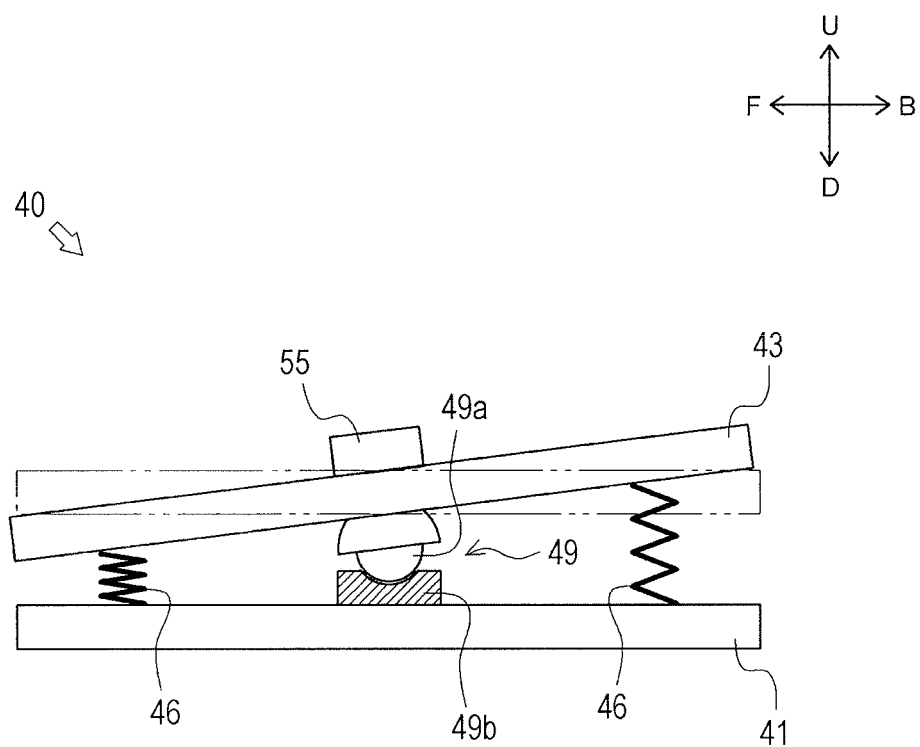
FIG. 17 is a schematic side view showing a riding part according to a sixth embodiment.

Specifically, as shown in FIG. 17, below the central part of a second member 43 (between the second member 43 and a first member 41) the ball joint 49 is provided. A spherical part 49a of the ball joint 49, and a saucer 49b of the ball joint 49 are fixed to the second member 43 and the first member 41, respectively. The spherical part 49a is slidably supported by the saucer 49b, so that the second member 43 can swing in an arbitrary direction with respect to the first member 41. The second member 43 is provided with a gyro sensor 55, and the swing direction and the swing angle of the second member 43 can be detected. Below both the front and rear ends and both the left and right ends of the second member 43 (between second member 43 and the first member 41), respective springs 46 are disposed. The springs 46 urge the second member 43 such that the second member 43 returns to a position parallel to the first member 41.

In FIG. 17, the springs 46 disposed below both the left and right ends of the second member 43 are not shown. The number of the springs 46 is not limited, and any number may be employed as long as the springs 46 urge the second member 43 such that the second member 43 returns to the position parallel to the first member.

In the riding part 40 thus configured, a worker rides on the second member 43. A controller 24*a* can calculate the forward and backward weight shift and the leftward and rightward weight shift of the worker from the swing direction and the swing angle of the second member 43 detected by the gyro sensor 55.

Although the gyro sensor 55 is used in the sixth embodiment, the forward and backward weight shift and the leftward and rightward weight shift of the worker can be detected by using limit switches, similarly to the third embodiment.

Hereinafter, a seventh embodiment of the traveling vehicle according to the disclosure is described.

Although the traveling vehicle 1 according to the first embodiment is configured to drive the driving wheel 30L and the driving wheel 30R by using electric power stored in the battery 21, the traveling vehicle can be configured to drive the driving wheel 30L and the driving wheel 30R by using power of an engine 100.

Figure 18:
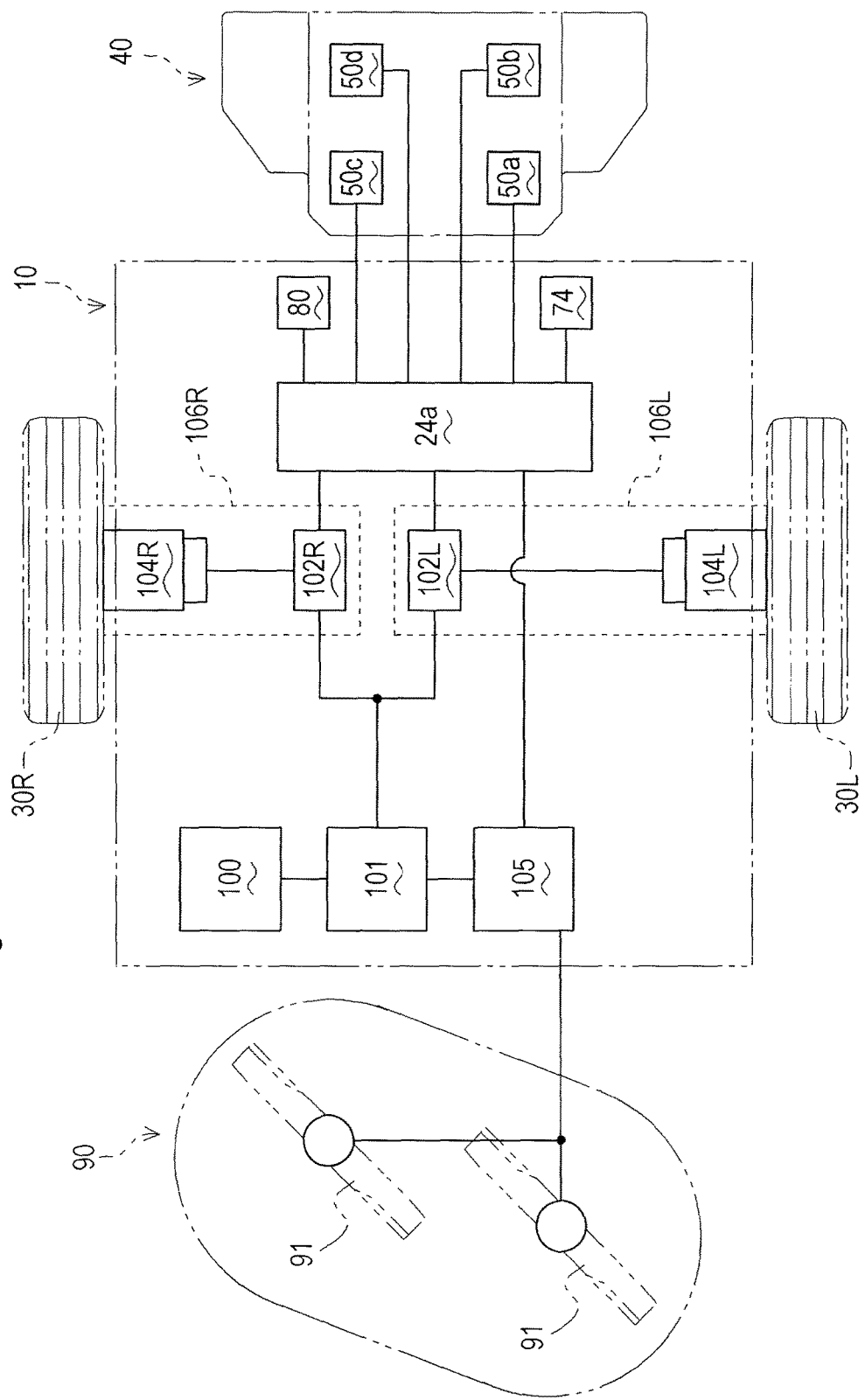
FIG. 18 is a schematic diagram showing a configuration related to the control of a traveling vehicle according to a seventh embodiment.

Specifically, as shown in FIG. 18, in a traveling vehicle 1 according to the seventh embodiment, a motive power part 20 includes the engine 100, a deceleration device 101, a left hydraulic pump 102L, a right hydraulic pump 102R, a left hydraulic motor 104L, a right hydraulic motor 104R, and a working clutch 105.

Power of the engine 100 is properly decelerated by the deceleration device 101, to be transmitted to the left hydraulic pump 102L and the right hydraulic pump 102R. The left hydraulic pump 102L and the right hydraulic pump 102R pump hydraulic oil by using the power from the engine 100. The hydraulic oil pumped from the left hydraulic pump 102L and the right hydraulic pump 102R is supplied to the left hydraulic motor 104L and the right hydraulic motor 104R. The left hydraulic motor 104L and the right hydraulic motor 104R are connected to a driving wheel 30L and a driving wheel 30R, respectively, and the left hydraulic motor 104L and the right hydraulic motor 104R can drive the driving wheel 30L and the driving wheel 30R, respectively. A controller 24*a* controls the operation of the left hydraulic pump 102L and the right hydraulic pump 102R (more specifically, a discharge quantity of hydraulic oil), so that it is possible to control hydraulic oil supplied to the left hydraulic motor 104L and the right hydraulic motor 104R, and also possible to control the rotation of the driving wheel 30L and the driving wheel 30R. The left hydraulic pump 102L and the left hydraulic motor 104L form a left HST (hydrostatic continuously variable transmission) 106L. Additionally, the right hydraulic pump 102R and the right hydraulic motor 104R form a right HST 106R.

The power of the engine 100 is transmitted to the working clutch 105 through the deceleration device 101. At this time, the power transmitted from the engine 100 to the working clutch 105 may be decelerated or not decelerate by the deceleration device 101. The power transmitted to the working clutch 105 is transmitted to blades 91 of a mower unit 90 through a belt for transmitting power. The operation of the working clutch 105 is controlled by the controller 24*a*. The working clutch 105 is optionally turned on or turned off, so that the blades 91 can be rotated or stopped.

Figure 19:
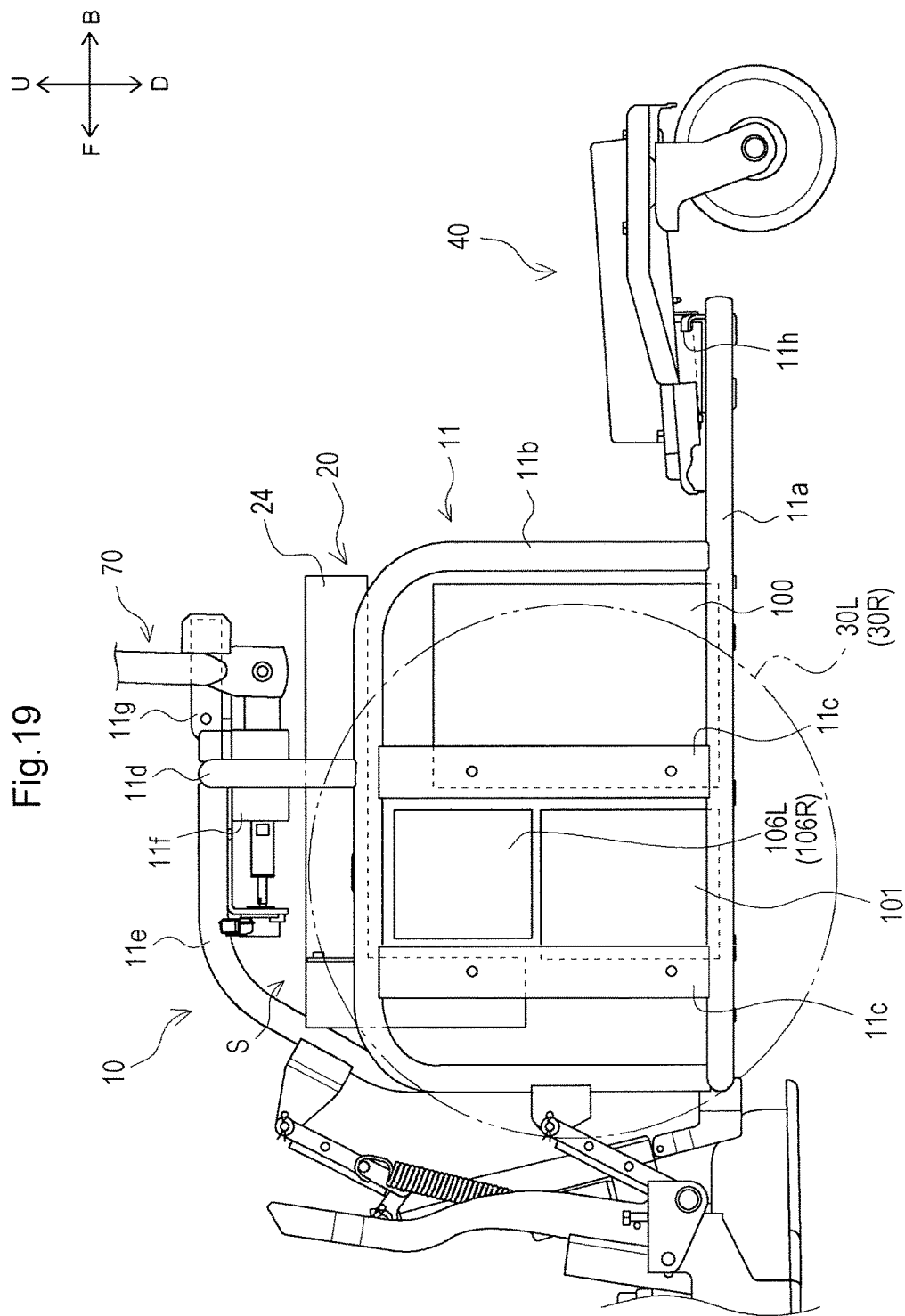
FIG. 19 is a side view showing a traveling machine body and a riding part of the traveling vehicle according to the seventh embodiment.

As shown in FIG. 19, the motive power part 20 according to the seventh embodiment is also disposed in a housing space S of a machine body frame 11, similarly to the first embodiment. Specifically, the engine 100 is disposed in the back part of the housing space S, and the deceleration device 101 is disposed in a central part in a front and back direction of the housing space S. Additionally, the left HST 106L and the right HST 106R are disposed above the deceleration device 101. A controller box 24 that houses the controller 24*a* and the like is disposed in the upper part of the housing space S.

Also in the seventh embodiment, a part of the component members of the motive power part 20 is disposed at such a position as to overlap with the driving wheel 30L and the driving wheel 30R in side view, similarly to the first embodiment. Specifically, as shown in FIG. 19, the deceleration device 101, the left HST 106l, and the right HST 106R are disposed at such a position that the whole of the deceleration device 101, the left HST 106l, and the right HST 106R overlaps with the driving wheel 30L and the driving wheel 30R. Thus, the component members of the motive power part 20 are disposed so as to overlap with the driving wheel 30L and the driving wheel 30R in side view, so that the traveling vehicle 1 can be made compact.

Hereinafter, an eighth embodiment of the traveling vehicle according to the disclosure is described.

Although the traveling vehicle 1 according to the seventh embodiment is configured to pump hydraulic oil by using the left and right hydraulic pumps (the left hydraulic pump 102L and the right hydraulic pump 102R), the traveling vehicle can be configured to pump hydraulic oil by using a single hydraulic pump 102.

Figure 20:
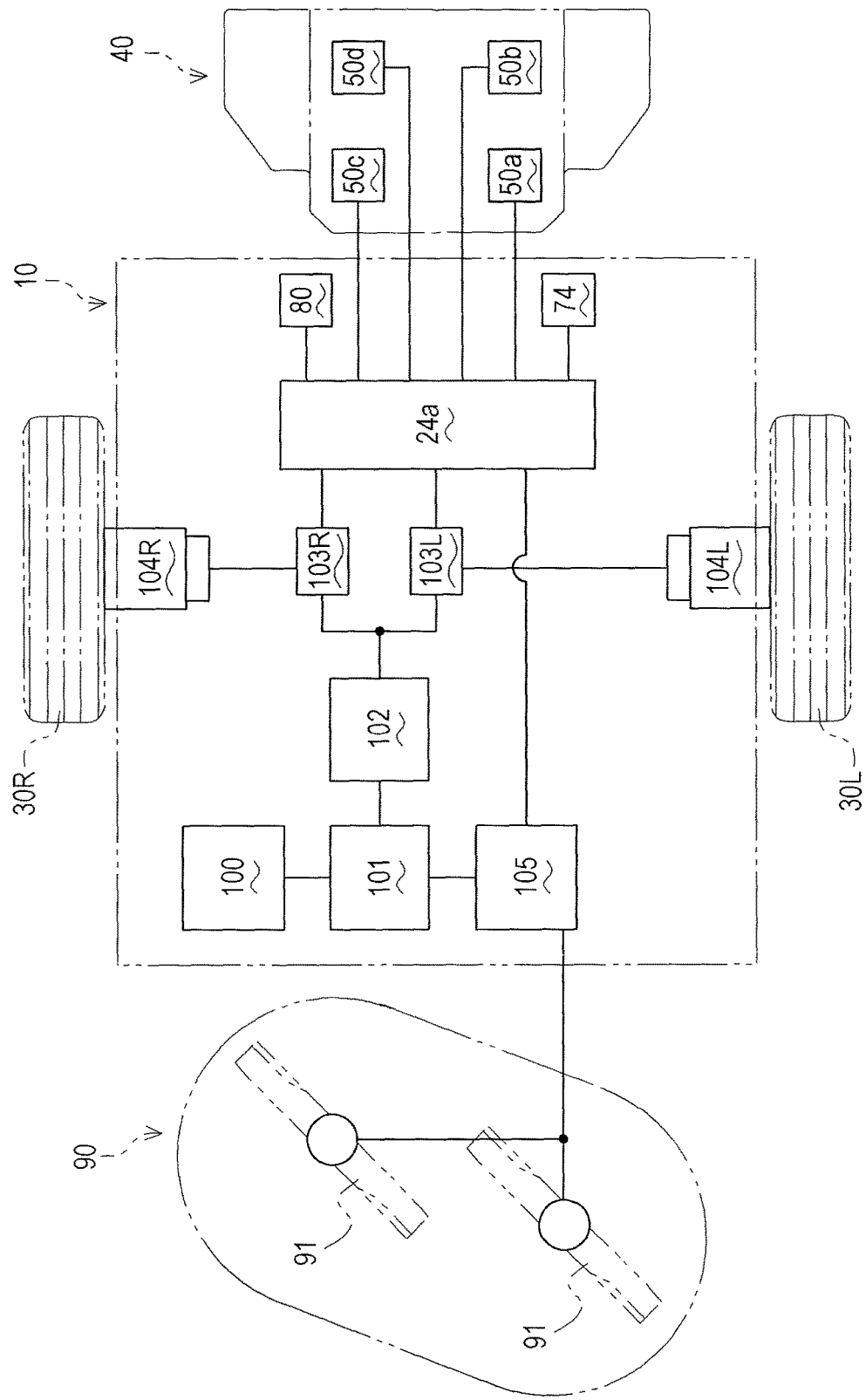
FIG. 20 is a schematic diagram showing a configuration related to the control of a traveling vehicle according to an eighth embodiment.

Specifically, as shown in FIG. 20, in a traveling vehicle 1 according to the eighth embodiment, a motive power part 20 includes an engine 100, a deceleration device 101, a hydraulic pump 102, a left regulating valve 1031, a right regulating valve 103R, a left hydraulic motor 104L, a right hydraulic motor 104R, and a working clutch 105.

Power of the engine 100 is properly decelerated by the deceleration device 101, to be transmitted to the hydraulic pump 102. The hydraulic pump 102 pumps hydraulic oil by using the power from the engine 100. The hydraulic oil pumped from the hydraulic pump 102 is supplied to the left hydraulic motor 104L and the right hydraulic motor 104R through the left regulating valve 103L and the right regulating valve 103R. The left hydraulic motor 104L and the right hydraulic motor 104R are connected to a driving wheel 30L and a driving wheel 30R, respectively, and the left hydraulic motor 104L and the right hydraulic motor 104R can drive the driving wheel 30L and the driving wheel 30R, respectively. A controller 24*a* controls the operation of the left regulating valve 103L and the right regulating valve 103R, so that it is possible to control hydraulic oil supplied to the left hydraulic motor 104L and the right hydraulic motor 104R, and also possible to control the rotation of the driving wheel 30L and the driving wheel 30R.

Figure 21:
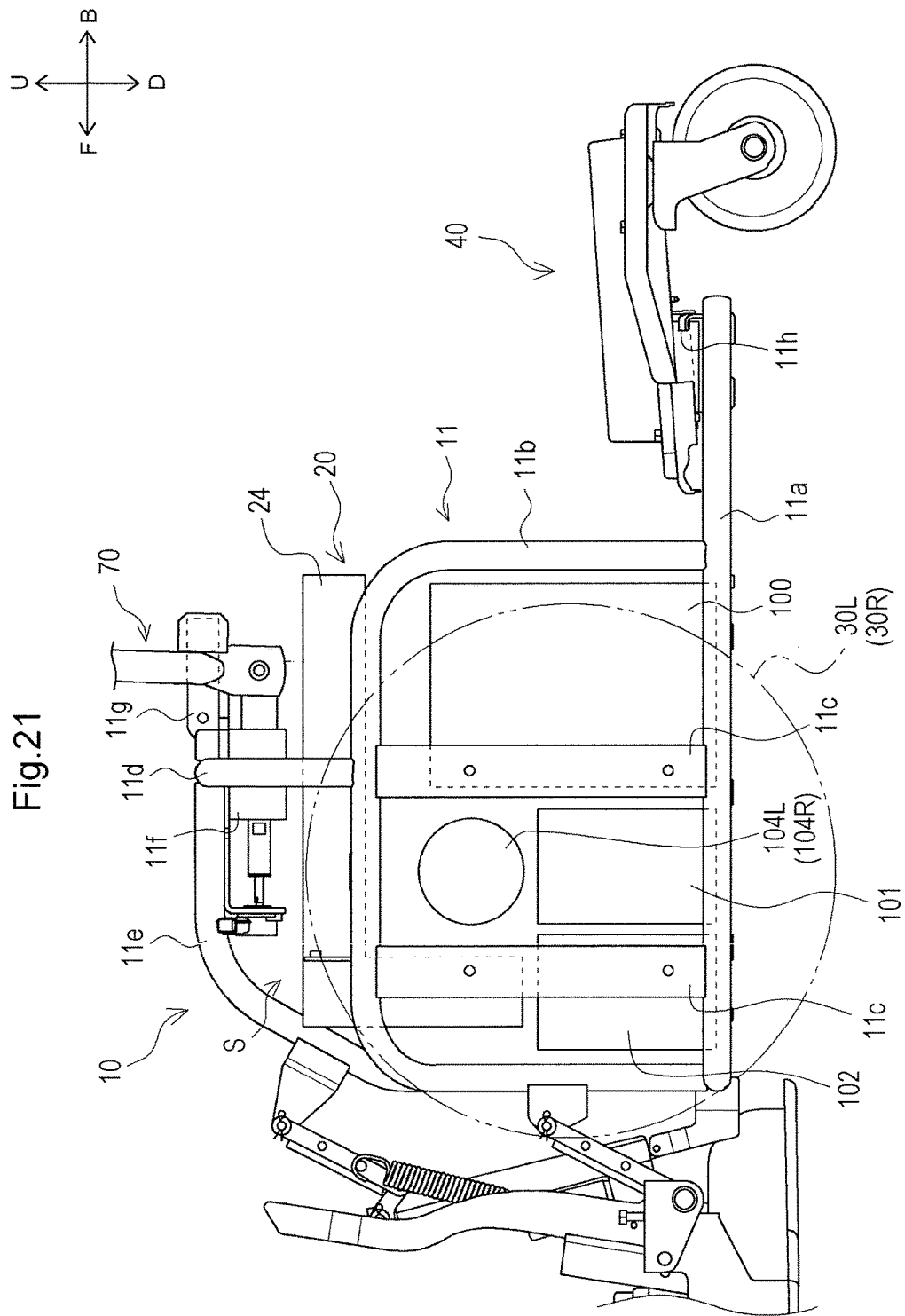
FIG. 21 is a side view showing a traveling machine body and a riding part of the traveling vehicle according to the eighth embodiment.

As shown in FIG. 21, the motive power part 20 according to the eighth embodiment is also disposed in a housing space S of a machine body frame 11, similarly to the first embodiment. Specifically, the engine 100 is disposed in the back part of the housing space S, the deceleration device 101 is disposed in the central part in the front and back direction of the housing space S, the hydraulic pump 102 is disposed in the front part of the housing space S. Additionally, the left hydraulic motor 104L and the right hydraulic motor 104R are disposed above the deceleration device 101. A controller box 24 that houses the controller 24*a* and the like is disposed in the upper part of the housing space S.

Also in the eighth embodiment, a part of the component members of the motive power part 20 is disposed at such a position as to overlap with the driving wheel 30L and the driving wheel 30R in side view, similarly to the first embodiment. Specifically, as shown in FIG. 21, the deceleration device 101, the hydraulic pump 102, the left hydraulic motor 104L and the right hydraulic motor 104R are disposed at such a position that the whole of the deceleration device 101, the hydraulic pump 102, the left hydraulic motor 104L and the right hydraulic motor 104R overlaps with the driving wheel 30L and the driving wheel 30R. Thus, the component members of the motive power part 20 are disposed so as to overlap with the driving wheel 30L and the driving wheel 30R in side view, so that the traveling vehicle 1 can be made compact.

Hereinafter a ninth embodiment of the traveling vehicle according to the disclosure is described.

Figure 22:
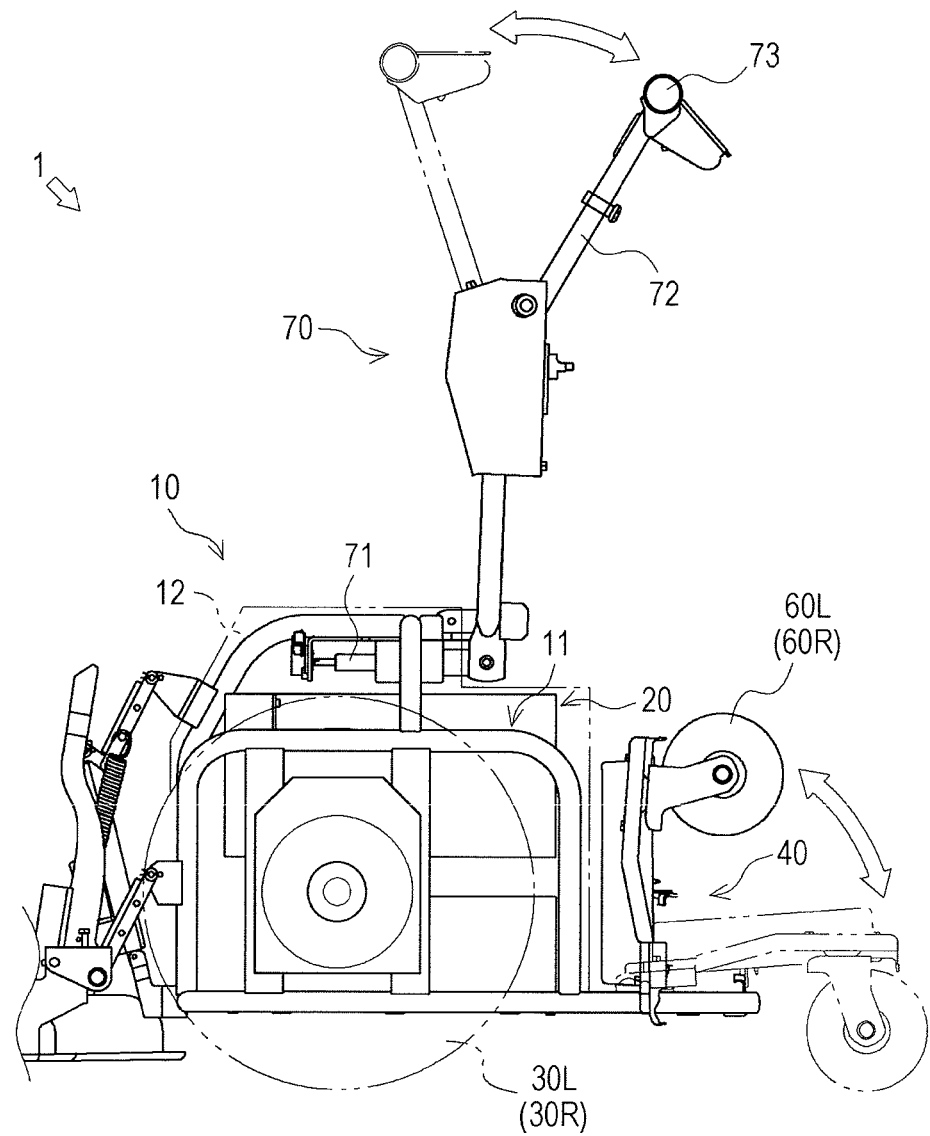
FIG. 22 is a side view showing a traveling vehicle according to a ninth embodiment.

In the ninth embodiment, as shown in FIG. 22, a riding part 40 and a handle 70 are configured to be swingable forward and backward. Specifically, the front end of the riding part 40 is rotatably connected to a traveling machine body 10. The rear end of the riding part 40 is lifted, so that the riding part 40 can be swung forward to be folded. The riding part 40 is held by a holding mechanism (not shown) in a state of swinging forward (in a state where the rear end is directed upward).

The handle 70 is provided with a swinging shaft in the middle in the vertical direction of a handle main body 72, and can swing a distal end side (grip part 73 side) forward and backward around the swinging shaft. The distal end side of the handle 70 can be held at an arbitrary position by the holding mechanism (not shown).

With such a configuration, a worker can drive the traveling vehicle 1 without riding on the riding part 40 while walking. At this time, the handle 70 is swung forward and backward to a desired position, so that the handle 70 can be adjusted to an easily gripped position. In this case, the weight shift of the worker cannot be detected, and therefore the handle 70 is provided with an operation tool (not shown) for driving the traveling vehicle 1.

In each of the above embodiments, the driven wheels (the driven wheel 60L and the driven wheel 60R) are provided so as to support the left part 41b and the right part 41c of the riding part 40. However, a driven wheel can be provided in other parts. For example, a single driven wheel can be provided below the central part 41a of the riding part 40, or a driven wheel can be provided in the rear part of the machine body frame 11 (lower frame 11a). That is, the driven wheel can be disposed at an arbitrary position different from the a rotational axis of the driving wheel 30L and the driving wheel 30R so as to support the traveling vehicle 1. Additionally, the number of driven wheels is not limited, any number of driving wheels may be provided.

In each of the above embodiments, the mower unit 90 is exemplified as a work device. However, another work device (e.g., a snow removing device or the like) can be used.

In each of the above embodiments, the rotation angle sensor (such as the rotation angle sensor 80) is configured by a potentiometer. However, any other sensor capable of detecting a rotation angle (such as a rotary encoder and a gyro sensor) can be used.

In each of the above embodiments, the traveling vehicle 1 is driven based on the weight shift of a worker and the swinging operation of the handle 70. However, the disclosure is not limited to this. For example, the handle 70 can be provided with an operation tool such as a joystick, and configured to drive the traveling vehicle 1 based on the weight shift of a worker and the operation of the operation tool.

The handle 70 described in each of the above embodiments is an example, and the shape or the like (e.g., the shape, or the position, or the like of the grip part 73) can be optionally changed. At this time, the height of the fulcrum shaft 71 that serves as a swing fulcrum of the handle 70 preferably is set to a range from at most a half of the height of the grip part 73 from the leg placing surfaces to at least one-third of the height of the grip part 73.

The number or the arrangement of the load sensors described in each of the above embodiments is an example, and is not limited. For example, it is possible to improve the detection accuracy of the weight shift of a worker by increasing the number of load sensors, or to prevent the malfunction of the traveling vehicle 1 when any of the load sensors is broken.

The arrangement of each member of the motive power part 20 described in each of the above embodiments is an example. As many members as possible are disposed at such a position as to overlap with the driving wheel 30L and the driving wheel 30R in side view, so that the traveling machine body 10 can be made compact.

The invention claimed is:

1. A traveling vehicle comprising:
    a traveling machine body supported by a pair of left and right driving wheels;
    a pair of left and right motors connected to the pair of left and right driving wheels, respectively, and configured to independently drive the pair of left and right driving wheels, respectively;
    a riding part disposed behind the traveling machine body, connected to the traveling machine body, configured to enable riding of a worker, and including a leg placing surface on which the worker places his/her leg when riding;
    a handle formed with a grip part configured to enable gripping by the worker who is riding on the riding part, the handle being connected to the traveling machine body so as to be swingable left and right about a swing fulcrum with respect to the traveling machine body, and provided at such a position that a height of the swing fulcrum is at most a half of a height from the leg placing surface to the grip part, and is higher than a height of the leg placing surface;
    a swinging operation detection sensor configured to detect a leftward and rightward swinging operation amount of the handle; and
    a controller configured to control operation of the pair of left and right motors based on a detection value by the swinging operation detection sensor.

2. The traveling vehicle as claimed in claim 1, further comprising:
    a motive power part for generating power for driving the pair of left and right driving wheels and transmitting the power to the pair of left and right driving wheels, the motive power part being provided in the traveling machine body;
    the motive power part being disposed below the swing fulcrum.

3. The traveling vehicle as claimed in claim 1, further comprising:
    a motive power part for generating power for driving the pair of left and right driving wheels and transmitting the power to the pair of left and right driving wheels, the motive power part being provided in the traveling machine body;

the motive power part including at least one of the motors, the controller, and a battery for supplying electric power to the motors.

4. The traveling vehicle as claimed in claim 1, wherein:
the swing fulcrum is provided at a height that is at least one-third of a height from the leg placing surface to the grip part.

5. A traveling vehicle comprising:
a traveling machine body supported by a pair of left and right driving wheels;
a pair of left and right motors connected to the pair of left and right driving wheels, respectively, and configured to independently drive the pair of left and right driving wheels, respectively;
a work device disposed in front of the traveling machine body, and connected to the traveling machine body;
a riding part disposed behind the traveling machine body, connected to the traveling machine body, and configured to enable riding of a worker;
a handle connected to the traveling machine body so as to be swingable left and right with respect to the traveling machine body;
a weight shift detection sensor configured to detect a forward and backward weight shift of the worker who is riding on the riding part;
a swinging operation detection sensor configured to detect a leftward and rightward swinging operation amount of the handle; and
a controller configured to control operation of the pair of left and right motors based on detection values by the weight shift detection sensor and the swinging operation detection sensor.

6. The traveling vehicle as claimed in claim 5, wherein:
the weight shift detection sensor includes a plurality of load sensors disposed by being shifted in a front and back direction.

7. The traveling vehicle as claimed in claim 5, wherein:
the riding part includes a first member connected to the traveling machine body, and a second member disposed above the first member, and formed with a leg placing surface on which the worker rides; and
the weight shift detection sensor is provided between the first member and the second member.

8. The traveling vehicle as claimed in claim 5, wherein:
the swinging operation detection sensor includes a rotation angle sensor configured to detect a leftward and rightward swing angle of the handle.

9. The traveling vehicle as claimed in claim 1, wherein:
the swing fulcrum extends in a front-and-back direction.

10. The traveling vehicle as claimed in claim 9, wherein:
the swing fulcrum comprises a front-and-back extending shaft.

11. The traveling vehicle as claimed in claim 1, wherein:
the leg placing surface is spaced upwardly from a ground surface on which the traveling machine is supported during said riding of a worker.

* * * * *